US008378666B2

(12) United States Patent
Putinier (10) Patent No.: US 8,378,666 B2
(45) Date of Patent: Feb. 19, 2013

(54) MULTI-TURN SENSOR

(75) Inventor: Rene Putinier, Chino Hills, CA (US)

(73) Assignee: BEI Duncan Electronics, Irvine, CA (US)

( * ) Notice: Subject to any disclaimer, the term of this patent is extended or adjusted under 35 U.S.C. 154(b) by 318 days.

(21) Appl. No.: 12/907,754

(22) Filed: Oct. 19, 2010

(65) Prior Publication Data

US 2011/0089936 A1   Apr. 21, 2011

Related U.S. Application Data (60) Provisional application No. 61/252,912, filed on Oct. 19, 2009.

(51) Int. Cl.
*G01B 7/30* (2006.01)
(52) U.S. Cl. .................................. 324/207.25
(58) Field of Classification Search .............. 324/207.25
See application file for complete search history.

(56) References Cited

U.S. PATENT DOCUMENTS

| | | | |
|---|---|---|---|
| 5,930,905 | A | 8/1999 | Zabler et al. |
| 7,154,263 | B2 | 12/2006 | Hatano |
| 2007/0103147 | A1 | 5/2007 | Kondo et al. |
| 2007/0132449 | A1 | 6/2007 | Madni et al. |

FOREIGN PATENT DOCUMENTS

| | | |
|---|---|---|
| JP | 2006234573 A | 9/2006 |
| JP | 2007322358 A | 12/2007 |
| KR | 100888242 B1 | 3/2009 |
| KR | 100911060 B1 | 8/2009 |

OTHER PUBLICATIONS

International Preliminary Report on Patentability, for PCT/US2010/053243, mailed May 3, 2012.

*Primary Examiner* — Reena Aurora
(74) *Attorney, Agent, or Firm* — Gilman Clark Hunter & Messina LLC (57) ABSTRACT

Techniques are provided for measuring angles of rotation of a rotatable body, and, in particular, for measuring angles of rotation of a rotating member that can rotate greater than 360 degrees. One example of these techniques is multi-turn angular position sensor that includes a main gear configured to couple to and rotate, in response to rotation of a rotation member, over a main gear rotation range, a first sensor gear engaged with the main gear and configured to experience more angular rotation than the main gear in response to rotation of the main gear, and a second sensor gear engaged with the main gear and configured to experience more angular rotation than the main gear and less angular rotation than the first sensor gear in response to rotation of the main gear.

19 Claims, 7 Drawing Sheets

MULTI-TURN SENSOR

This application claims the benefit of U.S. Provisional Application No. 61/252,912, filed Oct. 19, 2009, entitled "Method and Apparatus for a Multi-Turn Sensor," which is incorporated herein by reference for all purposes.

BACKGROUND

Techniques are provided for measuring angles of rotation of a rotatable body, and, in particular, for measuring angles of rotation of a rotating member that can rotate greater than 360 degrees.

In the automotive industry, some applications use angular measurements of steering wheels. For example, power steering units, electronic stability control, rear wheel steering systems, headlight steering, and roll prevention systems can all utilize a measurement, of the angular position of the steering wheel. Since the angular position of the steering wheel can vary by more than 360 degrees, an angular rotation sensor that can sense more than 360 degrees of rotation is used. In most automotive applications, a multi-turn sensor capable of measuring six complete rotations of the steering wheel is sufficient to cover the entire range of motion of a steering wheel.

Some examples of systems that have been used to measure the rotation of a rotatable body in a range greater than 360 degrees include optical sensors that use multi-turn counters and specialized algorithms to combine a turn count code with measurements from one or more single turn optical sensors. Another technique that has been used is gear reduction ratio, using the Vernier concept, for example. However, when using gear reduction ratio, the resolution and accuracy of the sensors is adversely affected. For example, if the gear ratio of the main gear to the small gear is six to one, then the accuracy of the angular sensor will be reduced by a factor of six as well. In many cases, this may not provide enough accuracy for the systems using the angle of rotation measurement.

Therefore, it is desirable to have an improved multi-turn sensor that provides a high degree of accuracy for multiple turns of a rotatable body, such as a steering wheel column, while still being simple and easily programmed such that it can be built at low cost and in a small package.

SUMMARY

An example of a multi-turn angular position sensor includes: a main gear configured to couple to and rotate, in response to rotation of a rotation member, over a main gear rotation range; a first sensor gear engaged with the main gear and configured to experience more angular rotation than the main gear in response to rotation of the main gear; and a second sensor gear engaged with the main gear and configured to experience more angular rotation than the main gear and less angular rotation than the first sensor gear in response to rotation of the main gear. The multi-turn angular position sensor also includes a first angular position sensor configured and disposed to sense rotation of the first sensor gear and to generate a first output signal indicative of rotation of the first sensor gear; and a second angular position sensor configured and disposed to sense rotation of the second sensor gear and to generate a second output signal indicative of rotation of the second sensor gear; where the main gear and the first and second sensor gears are configured such that a difference in a number of 360 degree revolutions experienced by the first sensor gear and the second sensor gear will be one 360 degree revolution or less in response to the main gear rotating through an expected full main gear rotation range greater than 360 degrees. The multi-turn angular position sensor also includes a processor communicatively coupled to the first and second angular position sensors and configured to: receive the first and second output signals, determine a difference between rotation of the first sensor gear and rotation of the second sensor gear based on the first and second outputs, determine an overall angular rotation of the first or second sensor gear from an initial angular position of the first or second sensor gear based on the difference and a present angular position of the first or second sensor gear, respectively, and determine an angular position of the main gear based on the overall angular rotation of the first or second sensor gear.

Implementations of the example multi-turn angular position sensor may include one or more of the following features. The processor is further configured to: determine a number of 360 degree revolutions that the first or second sensor gear has experienced from the initial angular position of the first or second sensor gear based on the difference; and determine the overall angular rotation of the first or second sensor gear based on the present angular position of the first or second sensor gear, respectively, and the number of 360 degree revolutions that the first or second sensor gear has experienced. The first and second outputs of the first and second angular position sensors are known for the initial angular positions of the first and second sensor gears when the main gear is in an initial angular position in the main gear rotation range, the first angle of rotation is relative to the initial angular position of the first sensor gear, and the second angle of rotation is relative to the initial angular position of the second sensor gear. The main gear has a number of teeth Nm, the first sensor gear has a number of teeth Ns1 and the second sensor gear has a number of teeth Ns2, and the expected full main gear rotation range is a number of 360 degree revolutions Tm or less, where Nm, Ns1, Ns2 and Tm are integers, and the product (Tm*Nm) is evenly divisible by Ns1 and Ns2. The number of teeth Ns2 is one greater than the number of teeth Ns1. Ns2 is eighteen, Ns1 is seventeen, Tm is six and Nm is fifty-one. The processor determines the difference between the rotations of the first and second sensor gears, DIFF, based on an algorithm comprising:

DIFF=sen1−sen2

IF (DIFF>180°) THEN DIFF=DIFF −360°

ELSE IF (DIFF<−180°) THEN DIFF=DIFF +360°

ENDIF; and determines the number of 360 degree revolutions, TURN, that the first or second sensor gear has experienced based on a relationship comprising:

$$\text{TURN} = TRUNC\left[\frac{DIFF + \frac{180 - sen}{N}}{\frac{360}{N}}\right]$$

where: sen1 is the sensed rotation of the first sensor gear, sen2 is the sensed rotation of the second sensor gear and sen is the sensed rotation of the first sensor gear or the second sensor gear, and
N is the number of 360 degree revolutions that the first or second sensor gear experiences in response to the main gear rotating through the desired full main gear rotation range.

Implementations of the example multi-turn angular position sensor may also, or alternatively, include one or more of the following features. The processor determines the angular position of the main gear, MAIN_GEAR_POSITION, based on equations comprising:

OVERALL_SEN_POSITION=TURN*360+sen

MAIN_GEAR_POSITION=OVERALL_SEN_POSITION/GR where: GR is a gear ratio between the main gear and the first sensor gear. At least one of the first or second angular position sensors is a Hall-effect sensor.

An example of a method of determining an angular position of an object includes: receiving a first output from a first angular position sensor, the first output being indicative of rotation of a first sensor gear engaged with a main gear, the main gear being configured to couple to and rotate, in response to rotation of a rotation member, over a main gear rotation range, the first sensor gear being configured to experience more angular rotation than the main gear in response to rotation of the main gear; receiving a second output from a second angular position sensor, the second output being indicative of rotation of a second sensor gear engaged with the main gear, the second sensor gear being configured to experience more angular rotation than the main gear and less angular rotation than the first sensor gear in response to rotation of the main gear; determining a difference between rotation of the first sensor gear and rotation of the second sensor gear based on the first and second outputs; determining an overall angular rotation of the first or second sensor gear from an initial angular position of the first or second sensor gear based on the difference and a present angular position of the first or second sensor gear, respectively; and determining an angular position of the main gear based on the overall angular rotation of the first or second sensor gear, where the main gear and the first and second sensor gears are configured such that a difference in a number of 360 degree revolutions experienced by the first sensor gear and the second sensor gear will be one 360 degree revolution or less in response to the main gear rotating through an expected full main gear rotation range greater than 360 degrees.

Implementations of the example method may also include one or more of the following features. The method further includes determining a number of 360 degree revolutions that the first or second sensor gear has experienced from an initial angular position of the first or second sensor gear based on the difference; and determining the overall angular rotation of the first or second sensor gear based on the present angular position of the first or second sensor gears, respectively, and the number of 360 degree revolutions that the first or second sensor gear has experienced. The first and second outputs of the first and second angular position sensors are known for the initial angular positions of the first and second sensor gears when the main gear is in an initial angular position in the main gear rotation range, the first angle of rotation is relative to the initial angular position of the first sensor gear, and the second angle of rotation is relative to the initial angular position of the second sensor gear. The main gear has a number of teeth Nm, the first sensor gear has a number of teeth Ns1 and the second sensor gear has a number of teeth Ns2, and the expected full main gear rotation range is a number of 360 degree revolutions Tm or less, where Nm, Ns1, Ns2 and Tm are integers, and the product (Tm*Nm) is evenly divisible by Ns1 and Ns2. The number of teeth. Ns2 is one greater than the number of teeth Ns1 Ns2 is eighteen, Ns1 is seventeen, Tm is six and Nm is fifty-one. The method further includes determining the difference between the rotations of the first and second sensor gears, DIFF, based on an algorithm comprising:

DIFF=sen1−sen2

IF (DIFF>180°) THEN DIFF=DIFF −360°

ELSE IF (DIFF<−180°) THEN DIFF=DIFF +360°

ENDIF; and determining the number of 360 degree revolutions, TURN, that the first or second sensor gear has experienced based on a relationship comprising:

$$\text{TURN} = TRUNC\left[\frac{DIFF + \frac{180 - sen}{N}}{\frac{360}{N}}\right]$$

where: sen1 is the sensed rotation of the first sensor gear, sen2 is the sensed rotation of the second sensor gear and sen is the sensed rotation of the first sensor gear or the second sensor gear, and N is the number of 360 degree revolutions that the first or second sensor gear experiences in response to the main gear rotating through the desired full main gear rotation range.

Implementations of the example method may also, or alternatively, include one or more of the following features. The method further includes determining the angular position of the main gear, MAIN_GEAR_POSITION, based on equations comprising:

OVERALL_SEN_POSITION=TURN*360+sen; and

MAIN_GEAR_POSITION=OVERALL_SEN_POSITION/GR where: GR is a gear ratio between the main gear and the first sensor gear. At least one of the first or second angular position sensors is a Hall-effect sensor.

Another example of a multi-turn angular position sensor includes: first sensor means for sensing a rotation of a first sensor gear engaged with a main gear and for outputting a first output indicative of the rotation of the first sensor gear, the main gear being configured to couple to and rotate, in response to rotation of a rotation member, over a main gear rotation range, the first sensor gear being configured to experience more angular rotation than the main gear in response to rotation of the main gear; second sensor means for sensing a rotation of a second sensor gear engaged with the main gear and for outputting a second output indicative of the rotation of the second sensor gear, the second sensor gear being configured to experience more angular rotation than the main gear and less angular rotation than the first sensor gear in response to rotation of the main gear; and processor means for: receiving the first output, receiving the second output, determining a difference between rotation of the first sensor gear and rotation of the second sensor gear based on the first and second outputs, determining an overall angular rotation of the first or second sensor gear from an initial angular position of the first or second sensor gear based on the difference and a present angular position of the first or second sensor gear, respectively, and determining an angular position of the main gear based on the overall angular rotation of the first or second sensor gear. The main gear and the first and second sensor gears are configured such that a difference in a number of 360 degree revolutions experienced by the first sensor gear and the second sensor gear will be one 360 degree revolution or less in response to the main gear rotating through an expected full main gear rotation range greater than 360 degrees.

DETAILED DESCRIPTION

Figure 1:
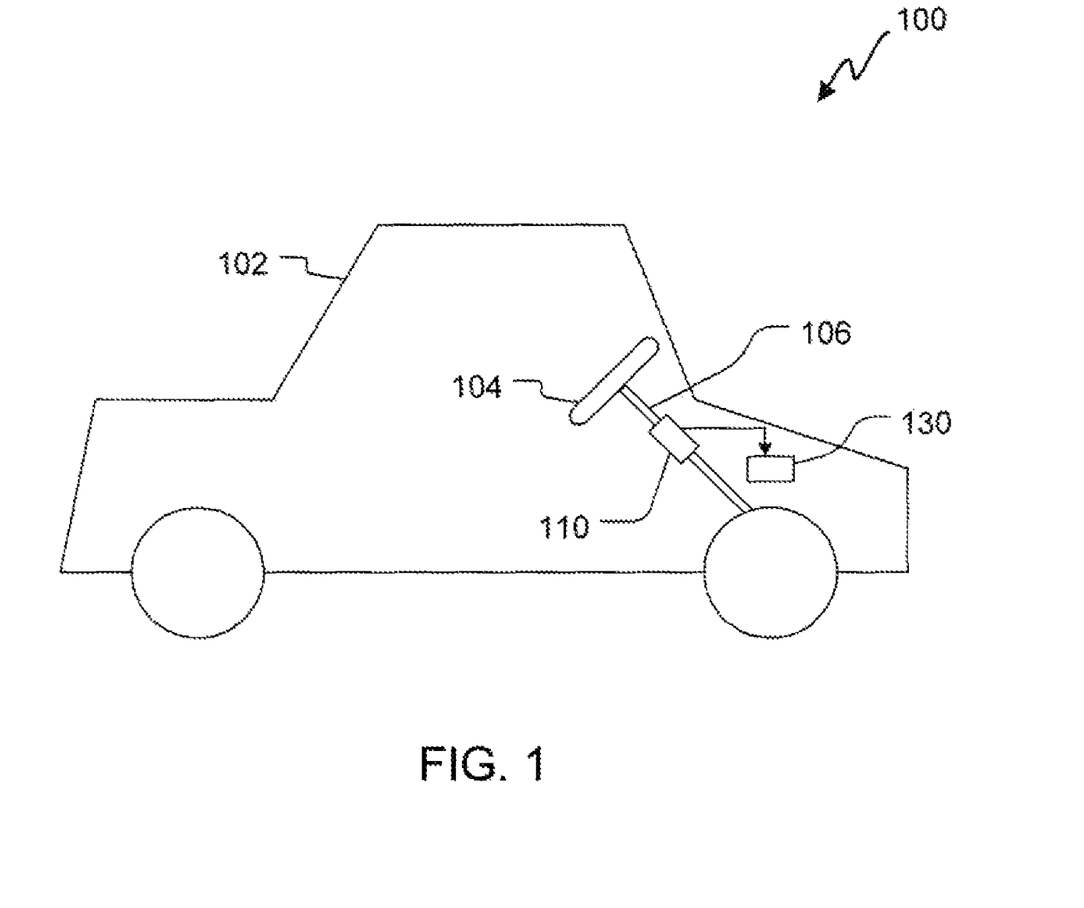
FIG. 1 is a schematic illustration of a vehicle that includes a multi-turn sensor.

Referring to FIG. 1, a vehicle 100 includes a body 102, and a steering wheel 104 coupled to a steering column 106. A multi-turn sensor 110 is coupled to the steering column 106. The multi-turn sensor 110 is capable of measuring angular positions for a range of multiple rotations of the steering wheel column and providing data indicative of the angular position to a central processor 130. The central processor 130 can be coupled to other systems of the vehicle 100 that use the angular measurements of the steering wheel column 106. For example, the central processor 130 can be used in processing the angular position signals and providing these to other systems including electronic stability control, roll control, rear wheel steering, headlight steering, roll prevention and/or other systems that use the angular position of the steering wheel. The vehicle 100 can be a car, a truck, a bus or other vehicle.

Figure 2:
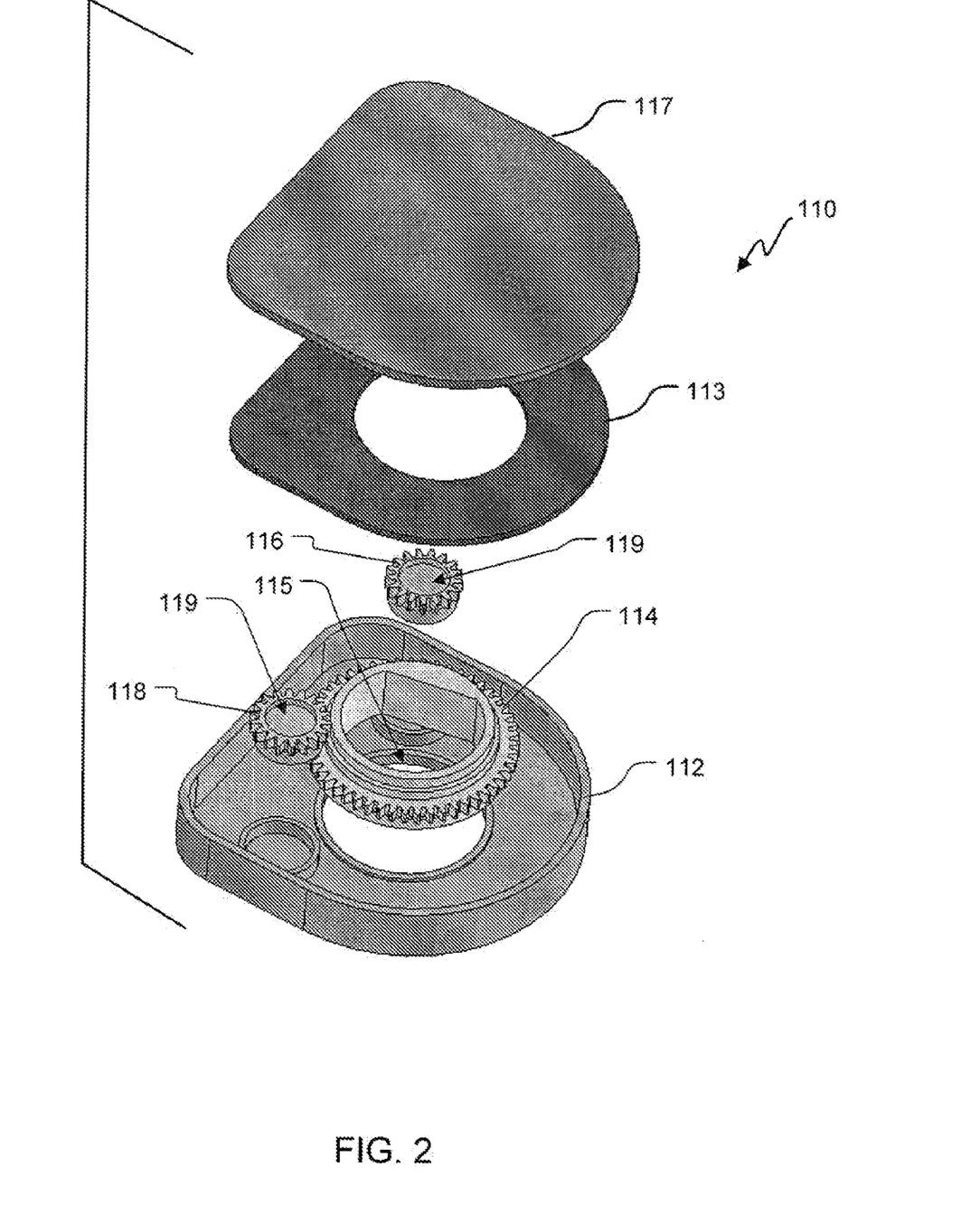
FIG. 2 is a perspective view of a multi-turn sensor.

Referring to FIG. 2, an example of the multi-turn sensor 110 includes a housing 112, a main gear 114, a first sensor gear 116, and a second sensor gear 118. Teeth of the main gear 114 engage and mesh with teeth of the first sensor gear 116 and teeth of the second sensor gear 118. The first sensor gear 116 and the second sensor gear 118 each include a magnet 119 inserted in respective centers of the first and second sensor gears 116 and 118. The magnets 119, in this example, are used in conjunction with a Hall-effect sensor (FIG. 3) to measure the angular positions of the first sensor gear 116 and the second sensor gear 118 from zero to 360 degrees. Alternatively to using Hall-effect sensors, other types of angular position sensors can be used. For example, anisotropic magneto-resistive sensors, optical sensors, inductive sensors, capacitive sensors, and/or resistive sensors may be used. Depending on the type of angular position sensor employed, the magnets 119 may or may not be used or provided and other measurement systems (e.g., optical measurement systems) may be attached to the first sensor gear 116 and/or the second sensor gear 118.

The main gear 114 is larger than both the first sensor gear 116 and the second sensor gear 118. The main gear 114 provides a center portion to receive a portion of the steering column 106. For each revolution of the main gear 114, the first sensor gear 116 rotates a certain number of rotations. In this example, the main gear 114 has 51 teeth and the first sensor gear 116 has 17 teeth. Thus, for each revolution of the main gear 114, the first sensor gear 116 rotates three times. The second sensor gear 118 is slightly larger than the first sensor gear 116. In this example, the second sensor gear 118 has 18 teeth.

The number of teeth of the first sensor gear 116, the second sensor gear 118, and the main gear 114 are chosen such that, for an expected full range of rotation of the main gear, which in this example is six 360° revolutions, the total number of revolutions of the first sensor gear 116 and the second sensor gear 118 differ by one complete revolution. The difference in number of revolutions of the sensor gears 116 and 118 until the main gear is rotated through the expected full main gear rotation range is less than one. In this example, for six revolutions of the main gear 114, the first sensor gear 116 will revolve 18 times, and the second sensor gear 118 will revolve 17 times. Since the number of revolutions between the first sensor gear 116 and the second sensor gear 118 differ by one over the expected full main gear rotation range, and less than one before that, during the six revolutions of the main gear 114, the difference between the angular positions of the first sensor gear 116 and the second sensor gear 118 varies between zero and 360 degrees (or between −180° and +180°). This is because the angular positions of the first and second sensor gears 116 and 118 never differ by more than one complete revolution during the six revolutions of the main gear 114. After six complete revolutions of the main gear, the first sensor gear 116 and the second sensor gear 118 will both have returned back to their original positions concurrently, since they have completed a full 17 and 18 rotations, respectively. The multi-turn sensor 110 also includes a cover 117 and a printed circuit board 113. The printed circuit board 113 contains the electronic components used to process the angular position sensor measurements. In the example shown, the multi-turn sensor 110 couples to an end of the steering column 106 and the cover 117 is solid. Alternatively, the cover 117 could be provided with a cutout portion such that the steering column passes through the cover 117.

Figure 3:
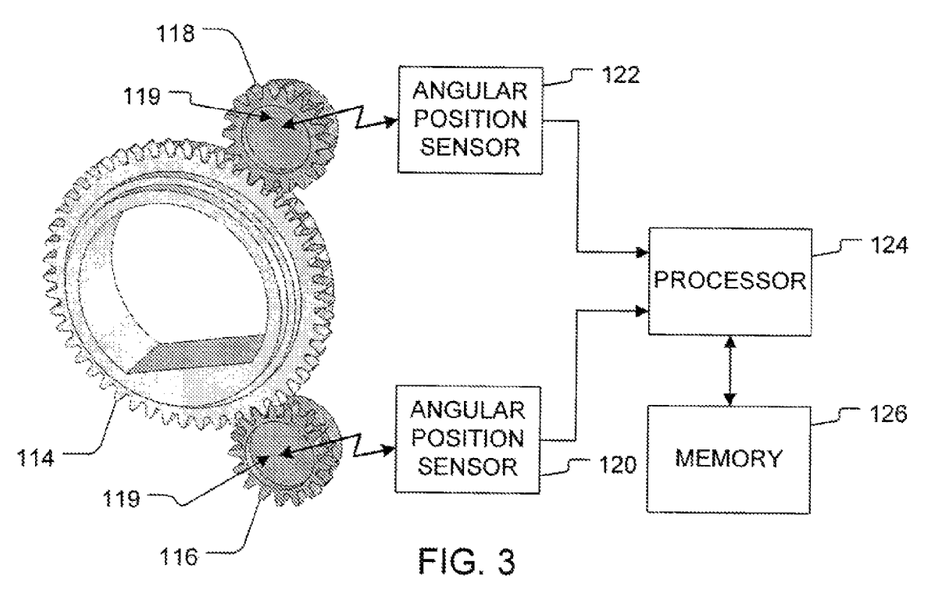
FIG. 3 is a functional block diagram of a processor system used in the multi-turn sensor of FIG. 2.

Referring to FIG. 3, a processing system of the multi-turn sensor 110 includes a first angular position sensor 120, a second angular position sensor 122, a processor 124, and a memory 126 coupled to the processor 124. The first angular position sensor 120 measures the angular position of the first sensor gear 116. The second angular position sensor 122 measures the angular position of the second sensor gear 118. In this example, the angular position sensors 120 and 122 are Hall-effect sensors. The Hall-effect sensors 120, 122 measure changes in the magnetic fields caused by the magnets 119 in the sensor gears 116, 118. The angular position sensors 120 and 122 produce signals representative of the angular positions of the first and second sensor gears 116, 118 from 0° to 360°. These angular position signals are provided to the processor 124 for performing the functions disclosed herein.

The processor 124 is a programmable device, e.g., a central processing unit (CPU), such as those made by Intel® Corporation or AMD®, a microcontroller, an application specific integrated circuit (ASIC), a field programmable gate array (FPGA), and/or logic gates etc. The memory 126 includes random access memory (RAM) and/or read-only memory (ROM). The memory 126 stores a computer program product comprising computer-readable, computer-executable software code containing instructions that are configured to, when executed, cause the processor 124 to perform various functions described herein. Alternatively, the software may not be directly executable by the processor 124 but configured to cause the processor 124, e.g., when the instructions are compiled and executed, to perform the functions described.

The processor 124, the first angular position sensor 120, and the second angular position sensor 122 are all mounted on the printed circuit board 113 contained within the housing 112 and cover 117 of the multi-turn sensor 110. The first angular position sensor 120 and second angular position sensor 122 are disposed on the printed circuit board and positioned above the magnets 119 that are located in the sensor gears 116, 118.

Whereas the multi-turn sensor 110 includes a main gear 114 with 51 teeth, a first sensor gear 116 with 17 teeth, and a second sensor gear 118 with 18 teeth, other combinations of gear sizes and numbers of teeth can be used. For example, for a six turn sensor, other combinations of numbers of teeth for the main gear 114, the first sensor gear 116 and the second sensor gear 118 that cause the first and second sensor gears 116 and 118, respectively, to differ by one revolution for the expected full rotation range, here six revolutions, of the main gear 114. Example gear teeth combinations include: (40, 15, and 16), (22, 11, and 12), (15, 9, and 10), (57, 18, and 19), and (70, 20, and 21). Other combinations of gear teeth numbers may also be used. If the expected full rotation range of the main gear 114 is more or less than six rotations, yet other combinations of gear teeth numbers can be used.

Determining which combination of gear teeth number and gear diameters to use depends on the size of the steering column 106, and the size of the housing 112 in which the gears are being installed. Another factor affecting the number of teeth to be chosen is the number of revolutions that, the main gear can see due to the, rotation of the steering column 106. For example, if five main gear revolutions will be the expected full rotation range, then gear teeth combinations different than those used for an expected full rotation range of six main gear revolutions will be used An example method for picking the number of teeth for the gears, such that the first sensor gear 116 experiences one less revolution than the second sensor gear 118 for the expected full range of motion of the main gear 114, includes the following operations:

1. For an expected maximum number of turns (360° revolutions) "Tm" of the main gear 114 that includes "Nm" number of teeth, the main gear 114 rotates through (Tm*Nm) number of teeth.
2. Choose numbers of teeth, Ns1 and Ns2, for the first and second sensor gears 116 and 118, respectively, where the numbers Ns1 and Ns2 differ by 1 tooth and the quantity "Tm*Nm" is evenly divisible by both Ns1 and Ns2.

As an example, the multi-turn sensor 110 discussed above includes a main gear 114 having 51 teeth, and first and second sensor gears 116 and 118 having 17 teeth and 18 teeth, respectively. The main gear 114 rotates through 306 (i.e., 51*6) teeth during six full revolutions. The number 306 is evenly divisible by both 17 and 18, i.e., the number of teeth of the first and second sensor gears 116 and 118, respectively. Other methods can be used, e.g., with sensor gears that differ by two teeth, three teeth or other numbers of teeth.

In some configurations, the number of teeth of the gears could be chosen such that the numbers of revolutions of the sensor gears, 116, 118 differ by other (e.g., less) than one full revolution for the expected full range of motion of the main gear 114. However, by differing by one complete revolution for the expected full range of motion of the main gear 114, the first and second sensor gears 116, 118 will return to their initial relative position after the main gear 114 rotates beyond the expected full range of motion. Thus, the multi-turn sensor 110 will continue to give proper readings even if an actual range of motion of the main gear 114 is greater than the expected full range of motion. In these situations, main gear rotations greater than the expected full main gear rotation range, here six revolutions, can be properly determined.

Figure 4:
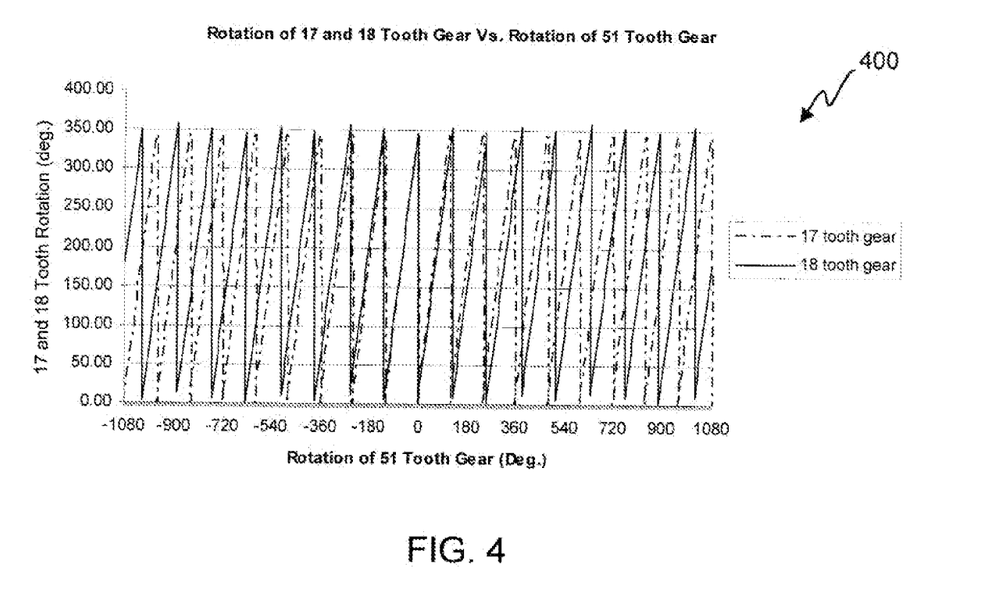
FIG. 4 is a graph showing a relationship between angles of rotation of two sensor gears versus an angle of rotation of a main gear of the multi-turn sensor of FIG. 2.

Referring to FIG. 4, a graph 400 shows the angles of rotation that the first senor gear 116 (labeled 17 tooth gear) and the second sensor gear 118 (labeled 18 tooth gear) experience during six complete revolutions of the main gear 114. In this example, the first sensor gear 116 and the second sensor gear 118 are initially at zero degrees when the main gear 114 is at zero degrees. These initial positions are convenient for illustration, but are not necessary. As can be seen by the graph 400, the first sensor gear 116 and the second sensor gear 118 change their angular position over time as the main gear 114 rotates. In this example, the first sensor gear 116 and the second sensor gear 118 differ by zero degrees when the main gear 114 is at zero degrees, differ by +180° when the main gear 114 has rotated three complete revolutions in the positive direction relative to 0° (i.e., is at +1080°), and differ by −180° when the main gear 114 has rotated three rotations in the negative direction relative to 0° (i.e., is at −1080°).

Figure 5:
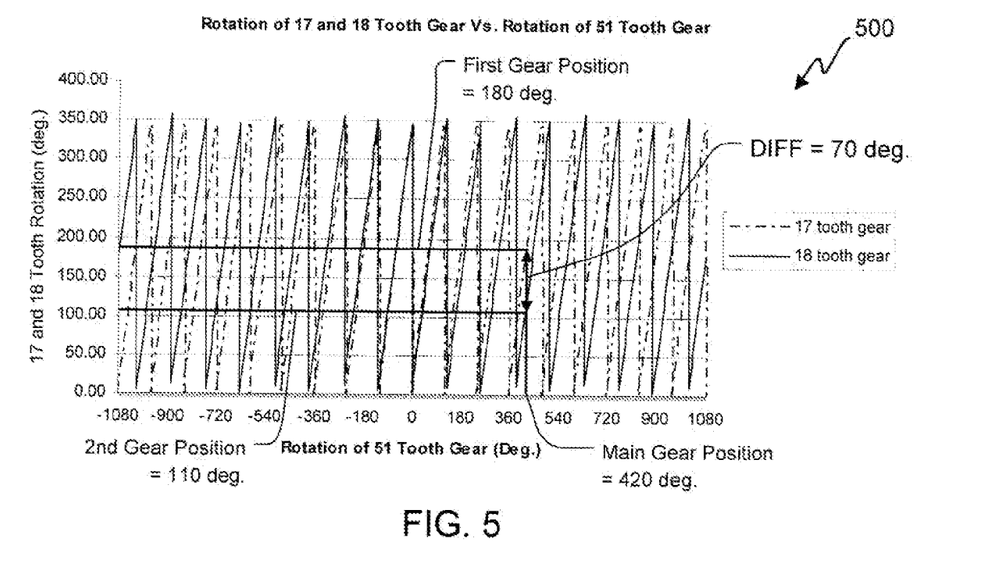
FIG. 5 is a graph highlighting a specific example of a difference between angles of rotation of two sensor gears with the main gear of the multi-turn sensor of FIG. 2 at a 420 degree angle of rotation.

Referring to FIG. 5, one specific example of a difference in the angular positions of the first sensor gear 116 and the second sensor gear 118 is highlighted in a graph 500. In the highlighted example, the first sensor gear 116 is at angular position of 180 degrees and the second sensor gear 118 is at an angular position of 110°. Thus, the difference (DIFF) between the angular positions of the first sensor gear 116 and the second sensor gear 118 is +70°. The following algorithm (1), represented in pseudo-code, is used to calculate DIFF over the expected full rotation range (six turns) of the main gear 114:

DIFF=sen1−sen2

IF (DIFF>180°) THEN DIFF=DIFF −360°

ELSE IF (DIFF<−180°) THEN DIFF=DIFF +360°  (1)

ENDIF  (1)

where:
sen1 is the sensed angular position of the first sensor gear 116 (from 0° to +360°), and
sen2 is the sensed angular position of the second sensor gear 118 (from 0° to +360°.

Algorithm (1) results in values of DIFF between −180° and +180° for sensed angular positions, sen1 and sen2 of the sensor gears 116 and 118, between 0° and +360°. If the angular position sensors 120 and 122 output angular positions in a range different than 0° to +360°, a different algorithm will be used to calculate DIFF. Since DIFF, per the DIFF algorithm (1), ranges linearly from −180° to +180° over the expected full range of motion of the main gear 114 (from −1080° to +1080°), the DIFF of 70° is unique for the specific position of the main gear 114. In this example, the angular position of the main gear 114 corresponding to a DIFF of +70° is +420°.

Figure 6:
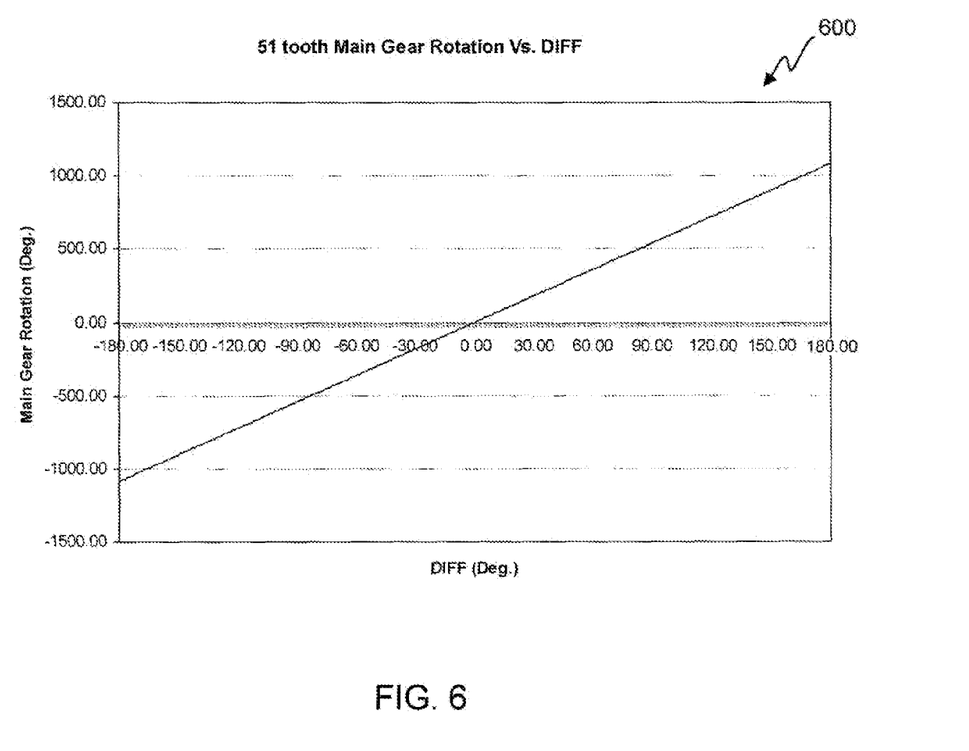
FIG. 6 is a graph illustrating an angle of rotation of the main gear versus a difference in angles of rotation (DIFF) of the sensor gears of the multi-turn sensor of FIG. 2.

Referring to FIG. 6, a graph 600 shows the relationship between DIFF, (i.e., the difference in the angular positions of the first sensor gear 116 and the second sensor gear 118) and the angular position of the main gear 114. As can be seen, the DIFF varies between −180 degrees and +180 in a linear fashion while the main gear 114 rotates between −1080 degrees and +1080. This linear relationship illustrates the simplicity with which calculating the unique angular position of the main gear 114 can be accomplished, by knowing the difference in angular positions of first sensor gear 116 and the second sensor gear 118.

Further processing is performed in determining the angular position of the main gear 114 to help improve the angular resolution provided by the angular position sensors 120 and 122. The DIFF value, per algorithm (1), is based on a difference between two angular positions provided by the angular position sensors 120, 122. The two angular positions are represented by a fixed number of bits, e.g., 12 bits providing 4096 values, for example. If the DIFF values are used directly to calculate the angular position of the main gear 114, over the expected main gear rotation range (e.g., 6 revolutions), then the 4096 values of DIFF are spread over 2,160° of rotation of the main gear 114. This works out to a resolution of slightly more than half a degree per value. This accuracy may not be enough for some applications, such as the steering applications used in a vehicle.

Figure 7:
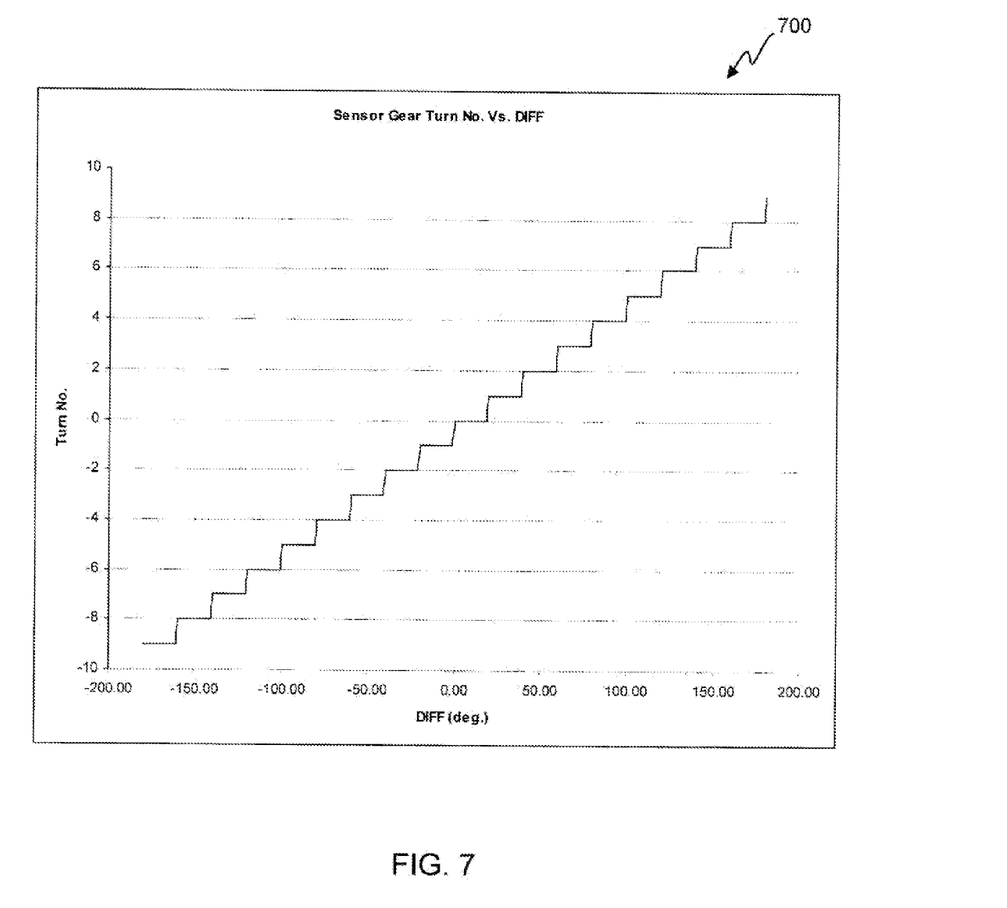
FIG. 7 is a graph illustrating a turn count number for one of the sensor gears versus the difference (DIFF) in angles of rotation of the sensor gears of FIG. 2.

In order to increase the accuracy of the multi-turn sensor 110, the turn number of the first sensor gear 116 or the second sensor gear 118 is identified for a specified DIFF value. Referring to FIG. 7, the relationship between a turn count of one of the sensor gears, in this case the first sensor gear 116, having 17 teeth, and the corresponding DIFF value is illustrated. The graph 700 shows a step function of the turn count starting at −9 for a DIFF value of −180° when the main gear is at −1,080°, stepping up for every turn of the first sensor gear 116, up to a turn count of +9 for the first sensor gear 116 for a DIFF value of +180° when the main gear 114 is in the +1,080° position.

By identifying the present turn count of one of the sensor gears 116, 118 for a specific DIFF value, the 4096 values provided by one of the angular position sensors 120, 122 are spread over 120° (e.g., 2,160°/18 turns of the sensor gear 116) of rotation of the main gear 114. The turn count can be determined because, as shown in FIG. 6, the DIFF algorithm is a simple linear relationship that does not repeat for any angular position of the main gear 114 within the expected main gear rotation range of six rotations, in this example. By identifying the present turn count of the first sensor gear 116 relative to a reference, zero turn count, position with the main gear at 0°, the accuracy of the angular position of the main gear 114 can be increased drastically. In this example, the following equation can be used to compute the turn count in which the first sensor gear 116 is located.

$$\text{TURN} = \text{TRUNC}\left[\frac{\text{DIFF} + \frac{180 - sen1}{N1}}{\frac{360}{N1}}\right] \quad (2)$$

where:
DIFF is determined using algorithm (1) above,
N1 is the number of revolutions that the first sensor gear 116 experiences (N1=18 in this example) while the main gear 114 rotates through its full range of rotation (alternatively, sen2 can be used instead of sen1 and N2=17 would then be used in place of N1=18, in which case TURN would be the turn count of the second sensor gear 118), and
TURN is an integer that uniquely identifies the turn count that the first sensor gear 116 is in. When calculating TURN, the value is truncated, not rounded, in this example, to arrive at an integer value.

After calculating the TURN value of the first sensor gear 116, using Equation (2), the following equation is used to calculate the overall position of the first sensor gear 116:

OVERALL_SEN1_POSITION=TURN*360+sen1 (3)

In Equation 3, since the TURN value multiplied by 360 degrees, plus the measurement of the first sensor gear 116 (sen1), gives the overall position of the first sensor gear 116, the accuracy of this overall position will be the same accuracy as is provided by the angular position sensor 120 that was used for measuring the angular position of the first sensor gear 116. After calculating the overall position of the first sensor gear with Equation (3), the following equation is used to calculate the main gear 114 angular position.

MAIN_GEAR_POSITION=OVERALL_SEN1_POSITION/GR (4)

where:
GR is the ratio of the number of teeth in the main gear 114 to number of teeth in the first sensor gear 116.

Since the main gear 114 angular position given by Equation (4) divides the first gear position by GR, the accuracy of the calculated main gear position is increased by a factor of GR by using a gear with a gear ratio of GR relative to the main gear 114. This increase in accuracy is three in the case of the multi-turn sensor 110, since the ratio between the number of teeth of the main gear 114 and the number of teeth of the first sensor gear 116 is three to one.

Table 1 below lists the resulting DIFF values, the main gear 114 angular positions, the turn counts and the overall angular position of the first sensor gear 116 for various angular positions of the first sensor gear 116 and the second sensor gear 118 for the multi-turn sensor 110 of FIG. 2. Table 1 lists the angular positions sen1 and sen2 for every 15 degrees of rotation of the first sensor gear 116.

TABLE 1

| Main Gear 114 Ang. Pos. (deg) Per Eqn. (4) | sen1: First Sensor Gear 116 Ang. of Rot. (deg) | sen2: Second Sensor Gear 118 (18 teeth) Ang. of Rot. (deg.) | DIFF Per Alg. (1) | TURN Per Eqn (2) | First Sensor Gear 116 Overall Ang. Pos. (deg.) Per Eqn. (3) |
|---|---|---|---|---|---|
| −1080.00 | 0.00 | 180.00 | −180.00 | −9.00 | −3240.00 |
| −1075.00 | 15.00 | 194.17 | −179.17 | −9.00 | −3225.00 |
| −1070.00 | 30.00 | 208.33 | −178.33 | −9.00 | −3210.00 |
| −1065.00 | 45.00 | 222.50 | −177.50 | −9.00 | −3195.00 |
| −1060.00 | 60.00 | 236.67 | −176.67 | −9.00 | −3180.00 |
| −1055.00 | 75.00 | 250.83 | −175.83 | −9.00 | −3165.00 |
| −1050.00 | 90.00 | 265.00 | −175.00 | −9.00 | −3150.00 |
| −1045.00 | 105.00 | 279.17 | −174.17 | −9.00 | −3135.00 |
| −1040.00 | 120.00 | 293.33 | −173.33 | −9.00 | −3120.00 |
| −1035.00 | 135.00 | 307.50 | −172.50 | −9.00 | −3105.00 |
| −1030.00 | 150.00 | 321.67 | −171.67 | −9.00 | −3090.00 |
| −1025.00 | 165.00 | 335.83 | −170.83 | −9.00 | −3075.00 |
| −1020.00 | 180.00 | 350.00 | −170.00 | −9.00 | −3060.00 |
| −1015.00 | 195.00 | 4.17 | −169.17 | −9.00 | −3045.00 |
| −1010.00 | 210.00 | 18.33 | −168.33 | −9.00 | −3030.00 |
| −1005.00 | 225.00 | 32.50 | −167.50 | −9.00 | −3015.00 |
| −1000.00 | 240.00 | 46.67 | −166.67 | −9.00 | −3000.00 |
| −995.00 | 255.00 | 60.83 | −165.83 | −9.00 | −2985.00 |
| −990.00 | 270.00 | 75.00 | −165.00 | −9.00 | −2970.00 |
| −985.00 | 285.00 | 89.17 | −164.17 | −9.00 | −2955.00 |
| −980.00 | 300.00 | 103.33 | −163.33 | −9.00 | −2940.00 |
| −975.00 | 315.00 | 117.50 | −162.50 | −9.00 | −2925.00 |
| −970.00 | 330.00 | 131.67 | −161.67 | −9.00 | −2910.00 |
| −965.00 | 345.00 | 145.83 | −160.83 | −9.00 | −2895.00 |
| −960.00 | 0.00 | 160.00 | −160.00 | −8.00 | −2880.00 |
| −955.00 | 15.00 | 174.17 | −159.17 | −8.00 | −2865.00 |
| −950.00 | 30.00 | 188.33 | −158.33 | −8.00 | −2850.00 |
| −945.00 | 45.00 | 202.50 | −157.50 | −8.00 | −2835.00 |
| −940.00 | 60.00 | 216.67 | −156.67 | −8.00 | −2820.00 |
| −935.00 | 75.00 | 230.83 | −155.83 | −8.00 | −2805.00 |
| −930.00 | 90.00 | 245.00 | −155.00 | −8.00 | −2790.00 |
| −925.00 | 105.00 | 259.17 | −154.17 | −8.00 | −2775.00 |
| −920.00 | 120.00 | 273.33 | −153.33 | −8.00 | −2760.00 |

TABLE 1-continued

| Main Gear 114 Ang. Pos. (deg) Per Eqn. (4) | sen1: First Sensor Gear 116 Ang. of Rot. (deg) | sen2: Second Sensor Gear 118 (18 teeth) Ang. of Rot. (deg.) | DIFF Per Alg. (1) | TURN Per Eqn (2) | First Sensor Gear 116 Overall Ang. Pos. (deg.) Per Eqn. (3) |
|---|---|---|---|---|---|
| −915.00 | 135.00 | 287.50 | −152.50 | −8.00 | −2745.00 |
| −910.00 | 150.00 | 301.67 | −151.67 | −8.00 | −2730.00 |
| −905.00 | 165.00 | 315.83 | −150.83 | −8.00 | −2715.00 |
| −900.00 | 180.00 | 330.00 | −150.00 | −8.00 | −2700.00 |
| −895.00 | 195.00 | 344.17 | −149.17 | −8.00 | −2685.00 |
| −890.00 | 210.00 | 358.33 | −148.33 | −8.00 | −2670.00 |
| −885.00 | 225.00 | 12.50 | −147.50 | −8.00 | −2655.00 |
| −880.00 | 240.00 | 26.67 | −146.67 | −8.00 | −2640.00 |
| −875.00 | 255.00 | 40.83 | −145.83 | −8.00 | −2625.00 |
| −870.00 | 270.00 | 55.00 | −145.00 | −8.00 | −2610.00 |
| −865.00 | 285.00 | 69.17 | −144.17 | −8.00 | −2595.00 |
| −860.00 | 300.00 | 83.33 | −143.33 | −8.00 | −2580.00 |
| −855.00 | 315.00 | 97.50 | −142.50 | −8.00 | −2565.00 |
| −850.00 | 330.00 | 111.67 | −141.67 | −8.00 | −2550.00 |
| −845.00 | 345.00 | 125.83 | −140.83 | −8.00 | −2535.00 |
| −840.00 | 0.00 | 140.00 | −140.00 | −7.00 | −2520.00 |
| −835.00 | 15.00 | 154.17 | −139.17 | −7.00 | −2505.00 |
| −830.00 | 30.00 | 168.33 | −138.33 | −7.00 | −2490.00 |
| −825.00 | 45.00 | 182.50 | −137.50 | −7.00 | −2475.00 |
| −820.00 | 60.00 | 196.67 | −136.67 | −7.00 | −2460.00 |
| −815.00 | 75.00 | 210.83 | −135.83 | −7.00 | −2445.00 |
| −810.00 | 90.00 | 225.00 | −135.00 | −7.00 | −2430.00 |
| −805.00 | 105.00 | 239.17 | −134.17 | −7.00 | −2415.00 |
| −800.00 | 120.00 | 253.33 | −133.33 | −7.00 | −2400.00 |
| −795.00 | 135.00 | 267.50 | −132.50 | −7.00 | −2385.00 |
| −790.00 | 150.00 | 281.67 | −131.67 | −7.00 | −2370.00 |
| −785.00 | 165.00 | 295.83 | −130.83 | −7.00 | −2355.00 |
| −780.00 | 180.00 | 310.00 | −130.00 | −7.00 | −2340.00 |
| −775.00 | 195.00 | 324.17 | −129.17 | −7.00 | −2325.00 |
| −770.00 | 210.00 | 338.33 | −128.33 | −7.00 | −2310.00 |
| −765.00 | 225.00 | 352.50 | −127.50 | −7.00 | −2295.00 |
| −760.00 | 240.00 | 6.67 | −126.67 | −7.00 | −2280.00 |
| −755.00 | 255.00 | 20.83 | −125.83 | −7.00 | −2265.00 |
| −750.00 | 270.00 | 35.00 | −125.00 | −7.00 | −2250.00 |
| −745.00 | 285.00 | 49.17 | −124.17 | −7.00 | −2235.00 |
| −740.00 | 300.00 | 63.33 | −123.33 | −7.00 | −2220.00 |
| −735.00 | 315.00 | 77.50 | −122.50 | −7.00 | −2205.00 |
| −730.00 | 330.00 | 91.67 | −121.67 | −7.00 | −2190.00 |
| −725.00 | 345.00 | 105.83 | −120.83 | −7.00 | −2175.00 |
| −720.00 | 0.00 | 120.00 | −120.00 | −6.00 | −2160.00 |
| −715.00 | 15.00 | 134.17 | −119.17 | −6.00 | −2145.00 |
| −710.00 | 30.00 | 148.33 | −118.33 | −6.00 | −2130.00 |
| −705.00 | 45.00 | 162.50 | −117.50 | −6.00 | −2115.00 |
| −700.00 | 60.00 | 176.67 | −116.67 | −6.00 | −2100.00 |
| −695.00 | 75.00 | 190.83 | −115.83 | −6.00 | −2085.00 |
| −690.00 | 90.00 | 205.00 | −115.00 | −6.00 | −2070.00 |
| −685.00 | 105.00 | 219.17 | −114.17 | −6.00 | −2055.00 |
| −680.00 | 120.00 | 233.33 | −113.33 | −6.00 | −2040.00 |
| −675.00 | 135.00 | 247.50 | −112.50 | −6.00 | −2025.00 |
| −670.00 | 150.00 | 261.67 | −111.67 | −6.00 | −2010.00 |
| −665.00 | 165.00 | 275.83 | −110.83 | −6.00 | −1995.00 |
| −660.00 | 180.00 | 290.00 | −110.00 | −6.00 | −1980.00 |
| −655.00 | 195.00 | 304.17 | −109.17 | −6.00 | −1965.00 |
| −650.00 | 210.00 | 318.33 | −108.33 | −6.00 | −1950.00 |
| −645.00 | 225.00 | 332.50 | −107.50 | −6.00 | −1935.00 |
| −640.00 | 240.00 | 346.67 | −106.67 | −6.00 | −1920.00 |
| −635.00 | 255.00 | 0.83 | −105.83 | −6.00 | −1905.00 |
| −630.00 | 270.00 | 15.00 | −105.00 | −6.00 | −1890.00 |
| −625.00 | 285.00 | 29.17 | −104.17 | −6.00 | −1875.00 |
| −620.00 | 300.00 | 43.33 | −103.33 | −6.00 | −1860.00 |
| −615.00 | 315.00 | 57.50 | −102.50 | −6.00 | −1845.00 |
| −610.00 | 330.00 | 71.67 | −101.67 | −6.00 | −1830.00 |
| −605.00 | 345.00 | 85.83 | −100.83 | −6.00 | −1815.00 |
| −600.00 | 0.00 | 100.00 | −100.00 | −5.00 | −1800.00 |
| −595.00 | 15.00 | 114.17 | −99.17 | −5.00 | −1785.00 |
| −590.00 | 30.00 | 128.33 | −98.33 | −5.00 | −1770.00 |
| −585.00 | 45.00 | 142.50 | −97.50 | −5.00 | −1755.00 |
| −580.00 | 60.00 | 156.67 | −96.67 | −5.00 | −1740.00 |
| −575.00 | 75.00 | 170.83 | −95.83 | −5.00 | −1725.00 |
| −570.00 | 90.00 | 185.00 | −95.00 | −5.00 | −1710.00 |
| −565.00 | 105.00 | 199.17 | −94.17 | −5.00 | −1695.00 |
| −560.00 | 120.00 | 213.33 | −93.33 | −5.00 | −1680.00 |
| −555.00 | 135.00 | 227.50 | −92.50 | −5.00 | −1665.00 |
| −550.00 | 150.00 | 241.67 | −91.67 | −5.00 | −1650.00 |
| −545.00 | 165.00 | 255.83 | −90.83 | −5.00 | −1635.00 |
| −540.00 | 180.00 | 270.00 | −90.00 | −5.00 | −1620.00 |
| −535.00 | 195.00 | 284.17 | −89.17 | −5.00 | −1605.00 |
| −530.00 | 210.00 | 298.33 | −88.33 | −5.00 | −1590.00 |
| −525.00 | 225.00 | 312.50 | −87.50 | −5.00 | −1575.00 |
| −520.00 | 240.00 | 326.67 | −86.67 | −5.00 | −1560.00 |
| −515.00 | 255.00 | 340.83 | −85.83 | −5.00 | −1545.00 |
| −510.00 | 270.00 | 355.00 | −85.00 | −5.00 | −1530.00 |
| −505.00 | 285.00 | 9.17 | −84.17 | −5.00 | −1515.00 |
| −500.00 | 300.00 | 23.33 | −83.33 | −5.00 | −1500.00 |
| −495.00 | 315.00 | 37.50 | −82.50 | −5.00 | −1485.00 |
| −490.00 | 330.00 | 51.67 | −81.67 | −5.00 | −1470.00 |
| −485.00 | 345.00 | 65.83 | −80.83 | −5.00 | −1455.00 |
| −480.00 | 0.00 | 80.00 | −80.00 | −4.00 | −1440.00 |
| −475.00 | 15.00 | 94.17 | −79.17 | −4.00 | −1425.00 |
| −470.00 | 30.00 | 108.33 | −78.33 | −4.00 | −1410.00 |
| −465.00 | 45.00 | 122.50 | −77.50 | −4.00 | −1395.00 |
| −460.00 | 60.00 | 136.67 | −76.67 | −4.00 | −1380.00 |
| −455.00 | 75.00 | 150.83 | −75.83 | −4.00 | −1365.00 |
| −450.00 | 90.00 | 165.00 | −75.00 | −4.00 | −1350.00 |
| −445.00 | 105.00 | 179.17 | −74.17 | −4.00 | −1335.00 |
| −440.00 | 120.00 | 193.33 | −73.33 | −4.00 | −1320.00 |
| −435.00 | 135.00 | 207.50 | −72.50 | −4.00 | −1305.00 |
| −430.00 | 150.00 | 221.67 | −71.67 | −4.00 | −1290.00 |
| −425.00 | 165.00 | 235.83 | −70.83 | −4.00 | −1275.00 |
| −420.00 | 180.00 | 250.00 | −70.00 | −4.00 | −1260.00 |
| −415.00 | 195.00 | 264.17 | −69.17 | −4.00 | −1245.00 |
| −410.00 | 210.00 | 278.33 | −68.33 | −4.00 | −1230.00 |
| −405.00 | 225.00 | 292.50 | −67.50 | −4.00 | −1215.00 |
| −400.00 | 240.00 | 306.67 | −66.67 | −4.00 | −1200.00 |
| −395.00 | 255.00 | 320.83 | −65.83 | −4.00 | −1185.00 |
| −390.00 | 270.00 | 335.00 | −65.00 | −4.00 | −1170.00 |
| −385.00 | 285.00 | 349.17 | −64.17 | −4.00 | −1155.00 |
| −380.00 | 300.00 | 3.33 | −63.33 | −4.00 | −1140.00 |
| −375.00 | 315.00 | 17.50 | −62.50 | −4.00 | −1125.00 |
| −370.00 | 330.00 | 31.67 | −61.67 | −4.00 | −1110.00 |
| −365.00 | 345.00 | 45.83 | −60.83 | −4.00 | −1095.00 |
| −360.00 | 0.00 | 60.00 | −60.00 | −3.00 | −1080.00 |
| −355.00 | 15.00 | 74.17 | −59.17 | −3.00 | −1065.00 |
| −350.00 | 30.00 | 88.33 | −58.33 | −3.00 | −1050.00 |
| −345.00 | 45.00 | 102.50 | −57.50 | −3.00 | −1035.00 |
| −340.00 | 60.00 | 116.67 | −56.67 | −3.00 | −1020.00 |
| −335.00 | 75.00 | 130.83 | −55.83 | −3.00 | −1005.00 |
| −330.00 | 90.00 | 145.00 | −55.00 | −3.00 | −990.00 |
| −325.00 | 105.00 | 159.17 | −54.17 | −3.00 | −975.00 |
| −320.00 | 120.00 | 173.33 | −53.33 | −3.00 | −960.00 |
| −315.00 | 135.00 | 187.50 | −52.50 | −3.00 | −945.00 |
| −310.00 | 150.00 | 201.67 | −51.67 | −3.00 | −930.00 |
| −305.00 | 165.00 | 215.83 | −50.83 | −3.00 | −915.00 |
| −300.00 | 180.00 | 230.00 | −50.00 | −3.00 | −900.00 |
| −295.00 | 195.00 | 244.17 | −49.17 | −3.00 | −885.00 |
| −290.00 | 210.00 | 258.33 | −48.33 | −3.00 | −870.00 |
| −285.00 | 225.00 | 272.50 | −47.50 | −3.00 | −855.00 |
| −280.00 | 240.00 | 286.67 | −46.67 | −3.00 | −840.00 |
| −275.00 | 255.00 | 300.83 | −45.83 | −3.00 | −825.00 |
| −270.00 | 270.00 | 315.00 | −45.00 | −3.00 | −810.00 |
| −265.00 | 285.00 | 329.17 | −44.17 | −3.00 | −795.00 |
| −260.00 | 300.00 | 343.33 | −43.33 | −3.00 | −780.00 |
| −255.00 | 315.00 | 357.50 | −42.50 | −3.00 | −765.00 |
| −250.00 | 330.00 | 11.67 | −41.67 | −3.00 | −750.00 |
| −245.00 | 345.00 | 25.83 | −40.83 | −3.00 | −735.00 |
| −240.00 | 0.00 | 40.00 | −40.00 | −2.00 | −720.00 |
| −235.00 | 15.00 | 54.17 | −39.17 | −2.00 | −705.00 |
| −230.00 | 30.00 | 68.33 | −38.33 | −2.00 | −690.00 |
| −225.00 | 45.00 | 82.50 | −37.50 | −2.00 | −675.00 |
| −220.00 | 60.00 | 96.67 | −36.67 | −2.00 | −660.00 |

TABLE 1-continued

| Main Gear 114 Ang. Pos. (deg) Per Eqn. (4) | sen1: First Sensor Gear 116 Ang. of Rot. (deg) | sen2: Second Sensor Gear 118 (18 teeth) Ang. of Rot. (deg.) | DIFF Per Alg. (1) | TURN Per Eqn (2) | First Sensor Gear 116 Overall Ang. Pos. (deg.) Per Eqn. (3) |
|---|---|---|---|---|---|
| −215.00 | 75.00 | 110.83 | −35.83 | −2.00 | −645.00 |
| −210.00 | 90.00 | 125.00 | −35.00 | −2.00 | −630.00 |
| −205.00 | 105.00 | 139.17 | −34.17 | −2.00 | −615.00 |
| −200.00 | 120.00 | 153.33 | −33.33 | −2.00 | −600.00 |
| −195.00 | 135.00 | 167.50 | −32.50 | −2.00 | −585.00 |
| −190.00 | 150.00 | 181.67 | −31.67 | −2.00 | −570.00 |
| −185.00 | 165.00 | 195.83 | −30.83 | −2.00 | −555.00 |
| −180.00 | 180.00 | 210.00 | −30.00 | −2.00 | −540.00 |
| −175.00 | 195.00 | 224.17 | −29.17 | −2.00 | −525.00 |
| −170.00 | 210.00 | 238.33 | −28.33 | −2.00 | −510.00 |
| −165.00 | 225.00 | 252.50 | −27.50 | −2.00 | −495.00 |
| −160.00 | 240.00 | 266.67 | −26.67 | −2.00 | −480.00 |
| −155.00 | 255.00 | 280.83 | −25.83 | −2.00 | −465.00 |
| −150.00 | 270.00 | 295.00 | −25.00 | −2.00 | −450.00 |
| −145.00 | 285.00 | 309.17 | −24.17 | −2.00 | −435.00 |
| −140.00 | 300.00 | 323.33 | −23.33 | −2.00 | −420.00 |
| −135.00 | 315.00 | 337.50 | −22.50 | −2.00 | −405.00 |
| −130.00 | 330.00 | 351.67 | −21.67 | −2.00 | −390.00 |
| −125.00 | 345.00 | 5.83 | −20.83 | −2.00 | −375.00 |
| −120.00 | 0.00 | 20.00 | −20.00 | −1.00 | −360.00 |
| −115.00 | 15.00 | 34.17 | −19.17 | −1.00 | −345.00 |
| −110.00 | 30.00 | 48.33 | −18.33 | −1.00 | −330.00 |
| −105.00 | 45.00 | 62.50 | −17.50 | −1.00 | −315.00 |
| −100.00 | 60.00 | 76.67 | −16.67 | −1.00 | −300.00 |
| −95.00 | 75.00 | 90.83 | −15.83 | −1.00 | −285.00 |
| −90.00 | 90.00 | 105.00 | −15.00 | −1.00 | −270.00 |
| −85.00 | 105.00 | 119.17 | −14.17 | −1.00 | −255.00 |
| −80.00 | 120.00 | 133.33 | −13.33 | −1.00 | −240.00 |
| −75.00 | 135.00 | 147.50 | −12.50 | −1.00 | −225.00 |
| −70.00 | 150.00 | 161.67 | −11.67 | −1.00 | −210.00 |
| −65.00 | 165.00 | 175.83 | −10.83 | −1.00 | −195.00 |
| −60.00 | 180.00 | 190.00 | −10.00 | −1.00 | −180.00 |
| −55.00 | 195.00 | 204.17 | −9.17 | −1.00 | −165.00 |
| −50.00 | 210.00 | 218.33 | −8.33 | −1.00 | −150.00 |
| −45.00 | 225.00 | 232.50 | −7.50 | −1.00 | −135.00 |
| −40.00 | 240.00 | 246.67 | −6.67 | −1.00 | −120.00 |
| −35.00 | 255.00 | 260.83 | −5.83 | −1.00 | −105.00 |
| −30.00 | 270.00 | 275.00 | −5.00 | −1.00 | −90.00 |
| −25.00 | 285.00 | 289.17 | −4.17 | −1.00 | −75.00 |
| −20.00 | 300.00 | 303.33 | −3.33 | −1.00 | −60.00 |
| −15.00 | 315.00 | 317.50 | −2.50 | −1.00 | −45.00 |
| −10.00 | 330.00 | 331.67 | −1.67 | −1.00 | −30.00 |
| −5.00 | 345.00 | 345.83 | −0.83 | −1.00 | −15.00 |
| 0.00 | 0.00 | 0.00 | 0.00 | 0.00 | 0.00 |
| 5.00 | 15.00 | 14.17 | 0.83 | 0.00 | 15.00 |
| 10.00 | 30.00 | 28.33 | 1.67 | 0.00 | 30.00 |
| 15.00 | 45.00 | 42.50 | 2.50 | 0.00 | 45.00 |
| 20.00 | 60.00 | 56.67 | 3.33 | 0.00 | 60.00 |
| 25.00 | 75.00 | 70.83 | 4.17 | 0.00 | 75.00 |
| 30.00 | 90.00 | 85.00 | 5.00 | 0.00 | 90.00 |
| 35.00 | 105.00 | 99.17 | 5.83 | 0.00 | 105.00 |
| 40.00 | 120.00 | 113.33 | 6.67 | 0.00 | 120.00 |
| 45.00 | 135.00 | 127.50 | 7.50 | 0.00 | 135.00 |
| 50.00 | 150.00 | 141.67 | 8.33 | 0.00 | 150.00 |
| 55.00 | 165.00 | 155.83 | 9.17 | 0.00 | 165.00 |
| 60.00 | 180.00 | 170.00 | 10.00 | 0.00 | 180.00 |
| 65.00 | 195.00 | 184.17 | 10.83 | 0.00 | 195.00 |
| 70.00 | 210.00 | 198.33 | 11.67 | 0.00 | 210.00 |
| 75.00 | 225.00 | 212.50 | 12.50 | 0.00 | 225.00 |
| 80.00 | 240.00 | 226.67 | 13.33 | 0.00 | 240.00 |
| 85.00 | 255.00 | 240.83 | 14.17 | 0.00 | 255.00 |
| 90.00 | 270.00 | 255.00 | 15.00 | 0.00 | 270.00 |
| 95.00 | 285.00 | 269.17 | 15.83 | 0.00 | 285.00 |
| 100.00 | 300.00 | 283.33 | 16.67 | 0.00 | 300.00 |
| 105.00 | 315.00 | 297.50 | 17.50 | 0.00 | 315.00 |
| 110.00 | 330.00 | 311.67 | 18.33 | 0.00 | 330.00 |
| 115.00 | 345.00 | 325.83 | 19.17 | 0.00 | 345.00 |
| 120.00 | 0.00 | 340.00 | 20.00 | 1.00 | 360.00 |
| 125.00 | 15.00 | 354.17 | 20.83 | 1.00 | 375.00 |
| 130.00 | 30.00 | 8.33 | 21.67 | 1.00 | 390.00 |
| 135.00 | 45.00 | 22.50 | 22.50 | 1.00 | 405.00 |
| 140.00 | 60.00 | 36.67 | 23.33 | 1.00 | 420.00 |
| 145.00 | 75.00 | 50.83 | 24.17 | 1.00 | 435.00 |
| 150.00 | 90.00 | 65.00 | 25.00 | 1.00 | 450.00 |
| 155.00 | 105.00 | 79.17 | 25.83 | 1.00 | 465.00 |
| 160.00 | 120.00 | 93.33 | 26.67 | 1.00 | 480.00 |
| 165.00 | 135.00 | 107.50 | 27.50 | 1.00 | 495.00 |
| 170.00 | 150.00 | 121.67 | 28.33 | 1.00 | 510.00 |
| 175.00 | 165.00 | 135.83 | 29.17 | 1.00 | 525.00 |
| 180.00 | 180.00 | 150.00 | 30.00 | 1.00 | 540.00 |
| 185.00 | 195.00 | 164.17 | 30.83 | 1.00 | 555.00 |
| 190.00 | 210.00 | 178.33 | 31.67 | 1.00 | 570.00 |
| 195.00 | 225.00 | 192.50 | 32.50 | 1.00 | 585.00 |
| 200.00 | 240.00 | 206.67 | 33.33 | 1.00 | 600.00 |
| 205.00 | 255.00 | 220.83 | 34.17 | 1.00 | 615.00 |
| 210.00 | 270.00 | 235.00 | 35.00 | 1.00 | 630.00 |
| 215.00 | 285.00 | 249.17 | 35.83 | 1.00 | 645.00 |
| 220.00 | 300.00 | 263.33 | 36.67 | 1.00 | 660.00 |
| 225.00 | 315.00 | 277.50 | 37.50 | 1.00 | 675.00 |
| 230.00 | 330.00 | 291.67 | 38.33 | 1.00 | 690.00 |
| 235.00 | 345.00 | 305.83 | 39.17 | 1.00 | 705.00 |
| 240.00 | 0.00 | 320.00 | 40.00 | 2.00 | 720.00 |
| 245.00 | 15.00 | 334.17 | 40.83 | 2.00 | 735.00 |
| 250.00 | 30.00 | 348.33 | 41.67 | 2.00 | 750.00 |
| 255.00 | 45.00 | 2.50 | 42.50 | 2.00 | 765.00 |
| 260.00 | 60.00 | 16.67 | 43.33 | 2.00 | 780.00 |
| 265.00 | 75.00 | 30.83 | 44.17 | 2.00 | 795.00 |
| 270.00 | 90.00 | 45.00 | 45.00 | 2.00 | 810.00 |
| 275.00 | 105.00 | 59.17 | 45.83 | 2.00 | 825.00 |
| 280.00 | 120.00 | 73.33 | 46.67 | 2.00 | 840.00 |
| 285.00 | 135.00 | 87.50 | 47.50 | 2.00 | 855.00 |
| 290.00 | 150.00 | 101.67 | 48.33 | 2.00 | 870.00 |
| 295.00 | 165.00 | 115.83 | 49.17 | 2.00 | 885.00 |
| 300.00 | 180.00 | 130.00 | 50.00 | 2.00 | 900.00 |
| 305.00 | 195.00 | 144.17 | 50.83 | 2.00 | 915.00 |
| 310.00 | 210.00 | 158.33 | 51.67 | 2.00 | 930.00 |
| 315.00 | 225.00 | 172.50 | 52.50 | 2.00 | 945.00 |
| 320.00 | 240.00 | 186.67 | 53.33 | 2.00 | 960.00 |
| 325.00 | 255.00 | 200.83 | 54.17 | 2.00 | 975.00 |
| 330.00 | 270.00 | 215.00 | 55.00 | 2.00 | 990.00 |
| 335.00 | 285.00 | 229.17 | 55.83 | 2.00 | 1005.00 |
| 340.00 | 300.00 | 243.33 | 56.67 | 2.00 | 1020.00 |
| 345.00 | 315.00 | 257.50 | 57.50 | 2.00 | 1035.00 |
| 350.00 | 330.00 | 271.67 | 58.33 | 2.00 | 1050.00 |
| 355.00 | 345.00 | 285.83 | 59.17 | 2.00 | 1065.00 |
| 360.00 | 0.00 | 300.00 | 60.00 | 3.00 | 1080.00 |
| 365.00 | 15.00 | 314.17 | 60.83 | 3.00 | 1095.00 |
| 370.00 | 30.00 | 328.33 | 61.67 | 3.00 | 1110.00 |
| 375.00 | 45.00 | 342.50 | 62.50 | 3.00 | 1125.00 |
| 380.00 | 60.00 | 356.67 | 63.33 | 3.00 | 1140.00 |
| 385.00 | 75.00 | 10.83 | 64.17 | 3.00 | 1155.00 |
| 390.00 | 90.00 | 25.00 | 65.00 | 3.00 | 1170.00 |
| 395.00 | 105.00 | 39.17 | 65.83 | 3.00 | 1185.00 |
| 400.00 | 120.00 | 53.33 | 66.67 | 3.00 | 1200.00 |
| 405.00 | 135.00 | 67.50 | 67.50 | 3.00 | 1215.00 |
| 410.00 | 150.00 | 81.67 | 68.33 | 3.00 | 1230.00 |
| 415.00 | 165.00 | 95.83 | 69.17 | 3.00 | 1245.00 |
| 420.00 | 180.00 | 110.00 | 70.00 | 3.00 | 1260.00 |
| 425.00 | 195.00 | 124.17 | 70.83 | 3.00 | 1275.00 |
| 430.00 | 210.00 | 138.33 | 71.67 | 3.00 | 1290.00 |
| 435.00 | 225.00 | 152.50 | 72.50 | 3.00 | 1305.00 |
| 440.00 | 240.00 | 166.67 | 73.33 | 3.00 | 1320.00 |
| 445.00 | 255.00 | 180.83 | 74.17 | 3.00 | 1335.00 |
| 450.00 | 270.00 | 195.00 | 75.00 | 3.00 | 1350.00 |
| 455.00 | 285.00 | 209.17 | 75.83 | 3.00 | 1365.00 |
| 460.00 | 300.00 | 223.33 | 76.67 | 3.00 | 1380.00 |
| 465.00 | 315.00 | 237.50 | 77.50 | 3.00 | 1395.00 |
| 470.00 | 330.00 | 251.67 | 78.33 | 3.00 | 1410.00 |
| 475.00 | 345.00 | 265.83 | 79.17 | 3.00 | 1425.00 |
| 480.00 | 0.00 | 280.00 | 80.00 | 4.00 | 1440.00 |

TABLE 1-continued

| Main Gear 114 Ang. Pos. (deg) Per Eqn. (4) | sen1: First Sensor Gear 116 Ang. of Rot. (deg) | sen2: Second Sensor Gear 118 (18 teeth) Ang. of Rot. (deg.) | DIFF Per Alg. (1) | TURN Per Eqn (2) | First Sensor Gear 116 Overall Ang. Pos. (deg.) Per Eqn. (3) |
|---|---|---|---|---|---|
| 485.00 | 15.00 | 294.17 | 80.83 | 4.00 | 1455.00 |
| 490.00 | 30.00 | 308.33 | 81.67 | 4.00 | 1470.00 |
| 495.00 | 45.00 | 322.50 | 82.50 | 4.00 | 1485.00 |
| 500.00 | 60.00 | 336.67 | 83.33 | 4.00 | 1500.00 |
| 505.00 | 75.00 | 350.83 | 84.17 | 4.00 | 1515.00 |
| 510.00 | 90.00 | 5.00 | 85.00 | 4.00 | 1530.00 |
| 515.00 | 105.00 | 19.17 | 85.83 | 4.00 | 1545.00 |
| 520.00 | 120.00 | 33.33 | 86.67 | 4.00 | 1560.00 |
| 525.00 | 135.00 | 47.50 | 87.50 | 4.00 | 1575.00 |
| 530.00 | 150.00 | 61.67 | 88.33 | 4.00 | 1590.00 |
| 535.00 | 165.00 | 75.83 | 89.17 | 4.00 | 1605.00 |
| 540.00 | 180.00 | 90.00 | 90.00 | 4.00 | 1620.00 |
| 545.00 | 195.00 | 104.17 | 90.83 | 4.00 | 1635.00 |
| 550.00 | 210.00 | 118.33 | 91.67 | 4.00 | 1650.00 |
| 555.00 | 225.00 | 132.50 | 92.50 | 4.00 | 1665.00 |
| 560.00 | 240.00 | 146.67 | 93.33 | 4.00 | 1680.00 |
| 565.00 | 255.00 | 160.83 | 94.17 | 4.00 | 1695.00 |
| 570.00 | 270.00 | 175.00 | 95.00 | 4.00 | 1710.00 |
| 575.00 | 285.00 | 189.17 | 95.83 | 4.00 | 1725.00 |
| 580.00 | 300.00 | 203.33 | 96.67 | 4.00 | 1740.00 |
| 585.00 | 315.00 | 217.50 | 97.50 | 4.00 | 1755.00 |
| 590.00 | 330.00 | 231.67 | 98.33 | 4.00 | 1770.00 |
| 595.00 | 345.00 | 245.83 | 99.17 | 4.00 | 1785.00 |
| 600.00 | 0.00 | 260.00 | 100.00 | 5.00 | 1800.00 |
| 605.00 | 15.00 | 274.17 | 100.83 | 5.00 | 1815.00 |
| 610.00 | 30.00 | 288.33 | 101.67 | 5.00 | 1830.00 |
| 615.00 | 45.00 | 302.50 | 102.50 | 5.00 | 1845.00 |
| 620.00 | 60.00 | 316.67 | 103.33 | 5.00 | 1860.00 |
| 625.00 | 75.00 | 330.83 | 104.17 | 5.00 | 1875.00 |
| 630.00 | 90.00 | 345.00 | 105.00 | 5.00 | 1890.00 |
| 635.00 | 105.00 | 359.17 | 105.83 | 5.00 | 1905.00 |
| 640.00 | 120.00 | 13.33 | 106.67 | 5.00 | 1920.00 |
| 645.00 | 135.00 | 27.50 | 107.50 | 5.00 | 1935.00 |
| 650.00 | 150.00 | 41.67 | 108.33 | 5.00 | 1950.00 |
| 655.00 | 165.00 | 55.83 | 109.17 | 5.00 | 1965.00 |
| 660.00 | 180.00 | 70.00 | 110.00 | 5.00 | 1980.00 |
| 665.00 | 195.00 | 84.17 | 110.83 | 5.00 | 1995.00 |
| 670.00 | 210.00 | 98.33 | 111.67 | 5.00 | 2010.00 |
| 675.00 | 225.00 | 112.50 | 112.50 | 5.00 | 2025.00 |
| 680.00 | 240.00 | 126.67 | 113.33 | 5.00 | 2040.00 |
| 685.00 | 255.00 | 140.83 | 114.17 | 5.00 | 2055.00 |
| 690.00 | 270.00 | 155.00 | 115.00 | 5.00 | 2070.00 |
| 695.00 | 285.00 | 169.17 | 115.83 | 5.00 | 2085.00 |
| 700.00 | 300.00 | 183.33 | 116.67 | 5.00 | 2100.00 |
| 705.00 | 315.00 | 197.50 | 117.50 | 5.00 | 2115.00 |
| 710.00 | 330.00 | 211.67 | 118.33 | 5.00 | 2130.00 |
| 715.00 | 345.00 | 225.83 | 119.17 | 5.00 | 2145.00 |
| 720.00 | 0.00 | 240.00 | 120.00 | 6.00 | 2160.00 |
| 725.00 | 15.00 | 254.17 | 120.83 | 6.00 | 2175.00 |
| 730.00 | 30.00 | 268.33 | 121.67 | 6.00 | 2190.00 |
| 735.00 | 45.00 | 282.50 | 122.50 | 6.00 | 2205.00 |
| 740.00 | 60.00 | 296.67 | 123.33 | 6.00 | 2220.00 |
| 745.00 | 75.00 | 310.83 | 124.17 | 6.00 | 2235.00 |
| 750.00 | 90.00 | 325.00 | 125.00 | 6.00 | 2250.00 |
| 755.00 | 105.00 | 339.17 | 125.83 | 6.00 | 2265.00 |
| 760.00 | 120.00 | 353.33 | 126.67 | 6.00 | 2280.00 |
| 765.00 | 135.00 | 7.50 | 127.50 | 6.00 | 2295.00 |
| 770.00 | 150.00 | 21.67 | 128.33 | 6.00 | 2310.00 |
| 775.00 | 165.00 | 35.83 | 129.17 | 6.00 | 2325.00 |
| 780.00 | 180.00 | 50.00 | 130.00 | 6.00 | 2340.00 |
| 785.00 | 195.00 | 64.17 | 130.83 | 6.00 | 2355.00 |
| 790.00 | 210.00 | 78.33 | 131.67 | 6.00 | 2370.00 |
| 795.00 | 225.00 | 92.50 | 132.50 | 6.00 | 2385.00 |
| 800.00 | 240.00 | 106.67 | 133.33 | 6.00 | 2400.00 |
| 805.00 | 255.00 | 120.83 | 134.17 | 6.00 | 2415.00 |
| 810.00 | 270.00 | 135.00 | 135.00 | 6.00 | 2430.00 |
| 815.00 | 285.00 | 149.17 | 135.83 | 6.00 | 2445.00 |
| 820.00 | 300.00 | 163.33 | 136.67 | 6.00 | 2460.00 |
| 825.00 | 315.00 | 177.50 | 137.50 | 6.00 | 2475.00 |
| 830.00 | 330.00 | 191.67 | 138.33 | 6.00 | 2490.00 |
| 835.00 | 345.00 | 205.83 | 139.17 | 6.00 | 2505.00 |
| 840.00 | 0.00 | 220.00 | 140.00 | 7.00 | 2520.00 |
| 845.00 | 15.00 | 234.17 | 140.83 | 7.00 | 2535.00 |
| 850.00 | 30.00 | 248.33 | 141.67 | 7.00 | 2550.00 |
| 855.00 | 45.00 | 262.50 | 142.50 | 7.00 | 2565.00 |
| 860.00 | 60.00 | 276.67 | 143.33 | 7.00 | 2580.00 |
| 865.00 | 75.00 | 290.83 | 144.17 | 7.00 | 2595.00 |
| 870.00 | 90.00 | 305.00 | 145.00 | 7.00 | 2610.00 |
| 875.00 | 105.00 | 319.17 | 145.83 | 7.00 | 2625.00 |
| 880.00 | 120.00 | 333.33 | 146.67 | 7.00 | 2640.00 |
| 885.00 | 135.00 | 347.50 | 147.50 | 7.00 | 2655.00 |
| 890.00 | 150.00 | 1.67 | 148.33 | 7.00 | 2670.00 |
| 895.00 | 165.00 | 15.83 | 149.17 | 7.00 | 2685.00 |
| 900.00 | 180.00 | 30.00 | 150.00 | 7.00 | 2700.00 |
| 905.00 | 195.00 | 44.17 | 150.83 | 7.00 | 2715.00 |
| 910.00 | 210.00 | 58.33 | 151.67 | 7.00 | 2730.00 |
| 915.00 | 225.00 | 72.50 | 152.50 | 7.00 | 2745.00 |
| 920.00 | 240.00 | 86.67 | 153.33 | 7.00 | 2760.00 |
| 925.00 | 255.00 | 100.83 | 154.17 | 7.00 | 2775.00 |
| 930.00 | 270.00 | 115.00 | 155.00 | 7.00 | 2790.00 |
| 935.00 | 285.00 | 129.17 | 155.83 | 7.00 | 2805.00 |
| 940.00 | 300.00 | 143.33 | 156.67 | 7.00 | 2820.00 |
| 945.00 | 315.00 | 157.50 | 157.50 | 7.00 | 2835.00 |
| 950.00 | 330.00 | 171.67 | 158.33 | 7.00 | 2850.00 |
| 955.00 | 345.00 | 185.83 | 159.17 | 7.00 | 2865.00 |
| 960.00 | 0.00 | 200.00 | 160.00 | 8.00 | 2880.00 |
| 965.00 | 15.00 | 214.17 | 160.83 | 8.00 | 2895.00 |
| 970.00 | 30.00 | 228.33 | 161.67 | 8.00 | 2910.00 |
| 975.00 | 45.00 | 242.50 | 162.50 | 8.00 | 2925.00 |
| 980.00 | 60.00 | 256.67 | 163.33 | 8.00 | 2940.00 |
| 985.00 | 75.00 | 270.83 | 164.17 | 8.00 | 2955.00 |
| 990.00 | 90.00 | 285.00 | 165.00 | 8.00 | 2970.00 |
| 995.00 | 105.00 | 299.17 | 165.83 | 8.00 | 2985.00 |
| 1000.00 | 120.00 | 313.33 | 166.67 | 8.00 | 3000.00 |
| 1005.00 | 135.00 | 327.50 | 167.50 | 8.00 | 3015.00 |
| 1010.00 | 150.00 | 341.67 | 168.33 | 8.00 | 3030.00 |
| 1015.00 | 165.00 | 355.83 | 169.17 | 8.00 | 3045.00 |
| 1020.00 | 180.00 | 10.00 | 170.00 | 8.00 | 3060.00 |
| 1025.00 | 195.00 | 24.17 | 170.83 | 8.00 | 3075.00 |
| 1030.00 | 210.00 | 38.33 | 171.67 | 8.00 | 3090.00 |
| 1035.00 | 225.00 | 52.50 | 172.50 | 8.00 | 3105.00 |
| 1040.00 | 240.00 | 66.67 | 173.33 | 8.00 | 3120.00 |
| 1045.00 | 255.00 | 80.83 | 174.17 | 8.00 | 3135.00 |
| 1050.00 | 270.00 | 95.00 | 175.00 | 8.00 | 3150.00 |
| 1055.00 | 285.00 | 109.17 | 175.83 | 8.00 | 3165.00 |
| 1060.00 | 300.00 | 123.33 | 176.67 | 8.00 | 3180.00 |
| 1065.00 | 315.00 | 137.50 | 177.50 | 8.00 | 3195.00 |
| 1070.00 | 330.00 | 151.67 | 178.33 | 8.00 | 3210.00 |
| 1075.00 | 345.00 | 165.83 | 179.17 | 8.00 | 3225.00 |
| 1080.00 | 0.00 | 180.00 | 180.00 | 9.00 | 3240.00 |

The accuracy at which the angular position of the main gear 114 can be determined is dependent on the accuracy of the angular position sensors 120 and 122 that are used in making the angular position measurements of the sensor gears 116, 118. For example, if the Hall-effect sensors output a 12 bit word representing the angular positions of the first and second sensor gears 116 and 118, respectively, this will result, in 4,096 values ($2^{12}$) for every 360 degrees of rotation of the first and second sensor gears 116 and 118. The overall position of the first sensor gear 116 could be specified within about 0.0879° (i.e., 360°/4096). Because the ratio of the number of teeth of the main gear 114 to the number of teeth of the first sensor gear 116 is three to one, the values for 360° of rotation of the gear 116 map to 120° of rotation of the main gear 114. Thus, the accuracy at which the angular position of the main gear 114 can be determined is about 0.029° (i.e., 0.0879/3 or 120°/4096). Thus, using the algorithms discussed above, the accuracy of the angular position information derivable from the angular position sensors 120 and 122 is improved by using the number of turns (TURN) given by Eqn. (2) in addition to the position sensor measurement sen1 (or alternatively sen2).

Figure 8:
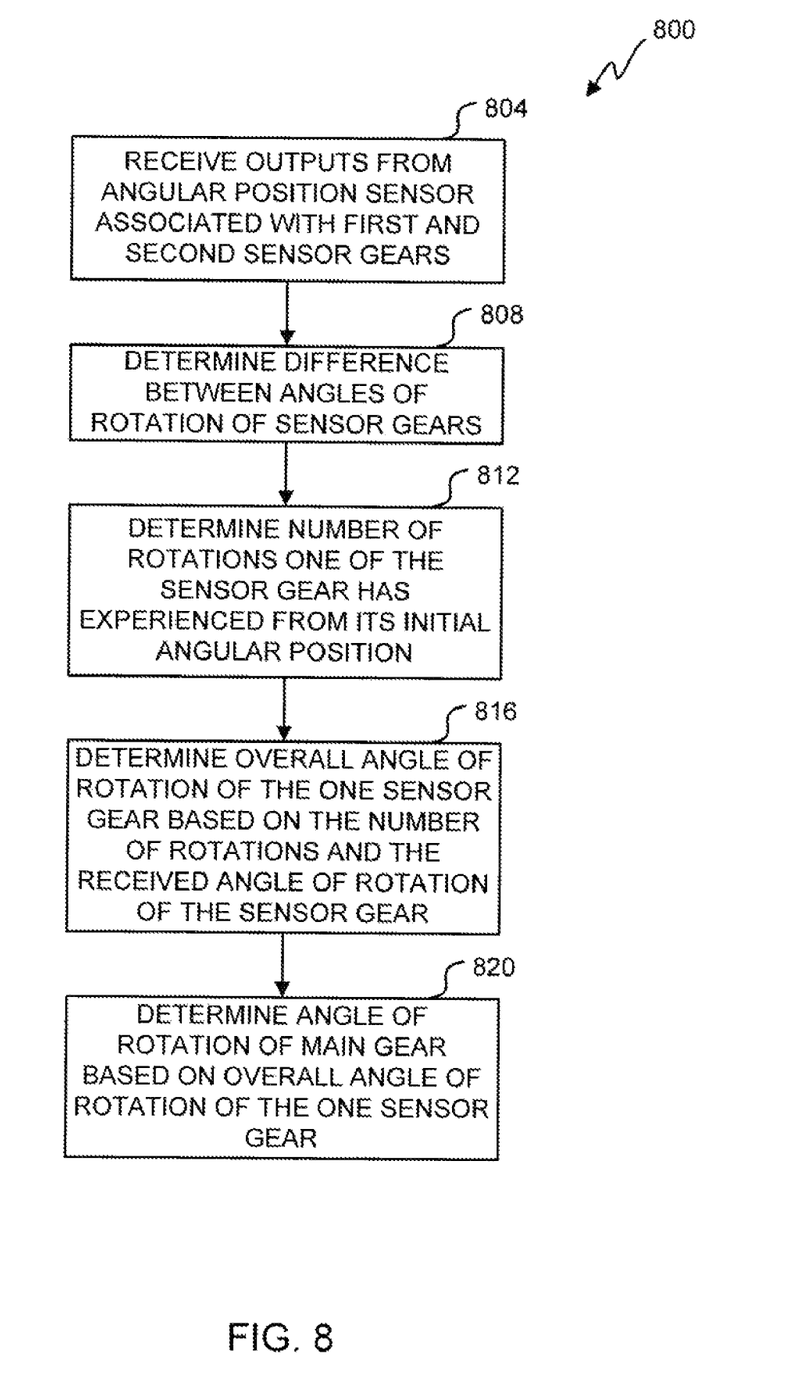
FIG. 8 is a flowchart of a process of determining an angle of rotation of a rotating member using the multi-turn sensor of FIG. 2.

Referring to FIG. 8, with further references to FIGS. 2 and 3, a process 800 of measuring an angular position of a rotatable body using the multi-turn sensor 110 of FIG. 2 includes the stages shown. The process 800 is, however, an example only and not limiting. The process 800 can be altered, e.g., by having stages added, removed, or rearranged.

Process 800 starts at stage 804 where the processor 124 receives outputs from the first and second angular position sensors 120 and 122. The outputs received from the angular position sensors 120 and 122 are indicative of the angular positions of the first sensor gear 116 and second sensor gear 118, respectively. The angular position in the outputs are indicative of the displacement from an initial position (zero degrees in the examples shown in FIGS. 5 and 6) of the sensor gears 116 and 118. For example, as discussed above, the first sensor gear 116 and second sensor gear 118 were at an initial position of zero degrees when the main gear 114 was also at zero degrees. However, this is an example only and the initial positions of the gears can be different from zero.

Upon receiving the first and second indications of the angular positions of the sensor gears 116 and 118, the process 800 continues at stage 808 where the processor 124 determines the difference (DIFF) between the angular positions of the first and second sensor gears 116 and 118. The value of DIFF is indicative of the relative difference between the displacements of the first sensor gear 116 and the second sensor gear 118 from their respective initial positions.

Upon determining the difference (DIFF) between the angular positions of the first sensor gear 116 and the second sensor gear 118; e.g., using algorithm (1), the processor 124, at stage 812, determines the number of complete turns or revolutions which one of the first sensor gear 116 or the second sensor gear 118 has experienced from its initial angular position. In this example, the number of turns of the first sensor gear 116 is determined to be between −9 and +9. using Eqn. (2), the processor 124 determines the integer number of complete revolutions (TURN) of the first sensor gear 116, based on the difference, DIFF, between the angular positions of the first sensor gear 116 and the second sensor gear 118.

Upon determining the value of the variable TURN, of the first sensor gear 116, the process 800 continues at stage 816 where the processor 124 determines the overall angular position of the first sensor gear 116 based on the value of the variable TURN and the received angle of rotation of the first sensor gear 116. This can be accomplished using Eqn. (3). Knowing the overall angular position of the first sensor gear 116 and knowing the gear ratio between the first sensor gear 116 and the main gear 114, the processor 124 determines the angular position of the main gear 114 at the stage 820 using Eqn. (4). This can be accomplished, in this case, by dividing the overall angular position determined for the first sensor gear 116 by three, giving the angular position of the main gear 114 within the +3 or −3 complete revolutions that the main gear 114 is expected to travel.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. Multi-turn sensors in accordance with the disclosure can be used to determine angular rotations for rotating members other than steering columns.

Further, more than one invention may be disclosed.

What is claimed is:

1. A multi-turn angular position sensor comprising:
   a main gear configured to couple to and rotate, in response to rotation of a rotation member, over a main gear rotation range;
   a first sensor gear engaged with the main gear and configured to experience more angular rotation than the main gear in response to rotation of the main gear;
   a second sensor gear engaged with the main gear and configured to experience more angular rotation than the main gear and less angular, rotation than the first sensor gear in response to rotation of the main gear;
   a first angular position sensor configured and disposed to sense rotation of the first sensor gear and to generate a first output signal indicative of rotation of the first sensor gear;
   a second angular position sensor configured and disposed to sense rotation of the second sensor gear and to generate a second output signal indicative of rotation of the second sensor gear;
   wherein the main gear and the first and second sensor gears are configured such that a difference in a number of 360 degree revolutions experienced by the first sensor gear and the second sensor gear will be one 360 degree revolution or less in response to the main gear rotating through an expected full main gear rotation range greater than 360 degrees; and
   a processor communicatively coupled to the first and second angular position sensors and configured to:
      receive the first and second output signals,
      determine a difference between rotation of the first sensor gear and rotation of the second sensor gear based on the first and second outputs,
      determine an overall angular rotation of the first or second sensor gear from an initial angular position of the first or second sensor gear based on the difference and a present angular position of the first or second sensor gear, respectively, and
      determine an angular position of the main gear based on the overall angular rotation of the first or second sensor gear.

2. The multi-turn angular position sensor of claim 1, wherein the processor is further configured to:
   determine a number of 360 degree revolutions that the first or second sensor gear has experienced from the initial angular position of the first or second sensor gear based on the difference; and
   determine the overall angular rotation of the first or second sensor gear based on the present angular position of the first or second sensor gear, respectively, and the number of 360 degree revolutions that the first or second sensor gear has experienced.

3. The multi-turn angular position sensor of claim 2, wherein the processor determines the difference between the rotations of the first and second sensor gears, DIFF, based on an algorithm comprising:

DIFF=sen1−sen2

IF (DIFF>180°) THEN DIFF=DIFF −360°

ELSE IF (DIFF <−180°) THEN DIFF=DIFF +360°

ENDIF; and determines the number of 360 degree revolutions, TURN, that the first or second sensor gear has experienced based on a relationship comprising:

$$TURN = TRUNC\left[\frac{DIFF + \frac{180-sen}{N}}{\frac{360}{N}}\right];$$

wherein:
sen1 is the sensed rotation of the first sensor gear, sen2 is the sensed rotation of the second sensor gear and sen is the sensed rotation of the first sensor gear or the second sensor gear, and N is the number of 360 degree revolutions that the first or second sensor gear experiences in response to the main gear rotating through the desired full main gear rotation range.

4. The multi-turn angular position sensor of claim 3 wherein the processor determines the angular position of the main gear, MAIN_GEAR_POSITION, based on equations comprising:

OVERALL_SEN_POSITION=TURN*360+sen; and

MAIN_GEAR_POSITION=OVERALL_SEN_POSITION/GR;

wherein GR is a gear ratio between the main gear and the first sensor gear.

5. The multi-turn angular position sensor of claim 1, wherein the first and second outputs of the first and second angular position sensors are known for the initial angular positions of the first and second sensor gears when the main gear is in an initial angular position in the main gear rotation range, the first angle of rotation is relative to the initial angular position of the first sensor gear, and the second angle of rotation is relative to the initial angular position of the second sensor gear.

6. The multi-turn angular position sensor of claim 1, wherein the main gear has a number of teeth Nm, the first sensor gear has a number of teeth Ns1 and the second sensor gear has a number of teeth Ns2, and the expected full main gear rotation range is a number of 360 degree revolutions Tm or less, wherein Nm, Ns1, Ns2 and Tm are integers, and further wherein the product (Tm*Nm) is evenly divisible by Ns1 and Ns2.

7. The multi-turn angular position sensor of claim 6 wherein the number of teeth Ns2 is one greater than the number of teeth Ns1.

8. The multi-turn angular position sensor of claim 7 wherein Ns2 is eighteen, Ns1 is seventeen, Tm is six and Nm is fifty-one.

9. The multi-turn angular position sensor of claim 1, wherein at least one of the first or second angular position sensors is a Hall-effect sensor.

10. A method of determining an angular position of an object, the method comprising:
receiving a first output from a first angular position sensor, the first output being indicative of rotation of a first sensor gear engaged with a main gear, the main gear being configured to couple to and rotate, in response to rotation of a rotation member, over a main gear rotation range, the first sensor gear being configured to experience more angular rotation than the main gear in response to rotation of the main gear;
receiving a second output from a second angular position sensor, the second output being indicative of rotation of a second sensor gear engaged with the main gear, the second sensor gear being configured to experience more angular rotation than the main gear and less angular rotation than the first sensor gear in response to rotation of the main gear;
determining a difference between rotation of the first sensor gear and rotation of the second sensor gear based on the first and second outputs;
determining an overall angular rotation of the first or second sensor gear from an initial angular position of the first or second sensor gear based on the difference and a present angular position of the first or second sensor gear, respectively; and
determining an angular position of the main gear based on the overall angular rotation of the first or second sensor gear,
wherein the main gear and the first and second sensor gears are configured such that a difference in a number of 360 degree revolutions experienced by the first sensor gear and the second sensor gear will be one 360 degree revolution or less in response to the main gear rotating through an expected full main gear rotation range greater than 360 degrees.

11. The method of claim 10 further comprising:
determining a number of 360 degree revolutions that the first or second sensor gear has experienced from an initial angular position of the first or second sensor gear based on the difference; and
determining the overall angular rotation of the first or second sensor gear based on the present angular position of the first or second sensor gears, respectively, and the number of 360 degree revolutions that the first or second sensor gear has experienced.

12. The method of claim 11 further comprising:
determining the difference between the rotations of the first and second sensor gears, DIFF, based on an algorithm comprising:

DIFF=sen1−sen2

IF (DIFF>180°) THEN DIFF=DIFF −360°

ELSE IF (DIFF<−180°) THEN DIFF=DIFF +360°

ENDIF; and determining the number of 360 degree revolutions, TURN, that the first or second sensor gear has experienced based on a relationship comprising:

$$TURN = TRUNC\left[\frac{DIFF + \frac{180-sen}{N}}{\frac{360}{N}}\right];$$

wherein:
sen1 is the sensed rotation of the first sensor gear, sen2 is the sensed rotation of the second sensor gear and sen is the sensed rotation of the first sensor gear or the second sensor gear, and N is the number of 360 degree revolutions that the first or second sensor gear experiences in response to the main gear rotating through the desired full main gear rotation range.

13. The method of claim 12 further comprising:
determining the angular position of the main gear, MAIN_GEAR_POSITION, based on equations comprising:

OVERALL_SEN_POSITION=TURN*360+sen; and

MAIN_GEAR_POSITION=OVERALL_SEN_POSITION/GR;

wherein GR is a gear ratio between the main gear and the first sensor gear.

14. The method of claim 10, wherein the first and second outputs of the first and second angular position sensors are known for the initial angular positions of the first and second sensor gears when the main gear is in an initial angular position in the main gear rotation range, the first angle of rotation is relative to the initial angular position of the first sensor gear, and the second angle of rotation is relative to the initial angular position of the second sensor gear.

15. The method of claim 10, wherein the main near has a number of teeth Nm, the first sensor gear has a number of teeth Ns1 and the second sensor gear has a number of teeth Ns2, and the expected full main gear rotation range is a number of 360 degree revolutions Tm or less, wherein Nm, Ns1, Ns2 and Tm are integers, and further wherein the product (Tm*Nm) is evenly divisible by Ns1 and Ns2.

16. The method of claim 15 wherein the number of teeth Ns2 is one greater than the number of teeth Ns1.

17. The method of claim 16 wherein Ns2 is eighteen, Ns1 is seventeen, Tm is six and Nm is fifty-one.

18. The method of claim 10, wherein at least one of the first or second angular position sensors is a Hall-effect sensor.

19. A multi-turn angular position sensor comprising:
first sensor means for sensing a rotation of a first sensor gear engaged with a main gear and for outputting a first output indicative of the rotation of the first sensor gear, the main gear being configured to couple to and rotate, in response to rotation of a rotation member, over a main gear rotation range, the first sensor gear being configured to experience more angular rotation than the main gear in response to rotation of the main gear;
second sensor means for sensing a rotation of a second sensor gear engaged with the main gear and for outputting a second output indicative of the rotation of the second sensor gear, the second sensor gear being configured to experience more angular rotation than the main gear and less angular rotation than the first sensor gear in response to rotation of the main gear; and
processor means for:
receiving the first output,
receiving the second output,
determining a difference between rotation of the first sensor gear and rotation of the second sensor gear based on the first and second outputs,
determining an overall angular rotation of the first or second sensor gear from an initial angular position of the first or second sensor gear based on the difference and a present angular position of the first or second sensor gear, respectively, and
determining an angular position of the main gear based on the overall angular rotation of the first or second sensor gear;
wherein the main gear and the first and second sensor gears are configured such that a difference in a number of 360 degree revolutions experienced by the first sensor gear and the second sensor gear will be one 360 degree revolution or less in response to the main gear rotating through an expected full main gear rotation range greater than 360 degrees.

* * * * *